(12) United States Patent
Itai

(10) Patent No.: US 11,818,313 B2
(45) Date of Patent: Nov. 14, 2023

(54) TERMINAL DEVICE FOR CONTROLLING OPERATION MODE OF IMAGE FORMING APPARATUS, AND SYSTEM FOR CONTROLLING OPERATION MODE OF IMAGE FORMING APPARATUS BY USING TERMINAL DEVICE

(71) Applicant: SHARP KABUSHIKI KAISHA, Osaka (JP)

(72) Inventor: Tsutomu Itai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/893,686

(22) Filed: Aug. 23, 2022

(65) Prior Publication Data

US 2023/0066743 A1 Mar. 2, 2023

(30) Foreign Application Priority Data

Aug. 27, 2021 (JP) ................................ 2021-139322

(51) Int. Cl.
*H04N 1/00* (2006.01)
(52) U.S. Cl.
CPC ..... *H04N 1/00896* (2013.01); *H04N 1/00204* (2013.01); *H04N 1/00344* (2013.01); *H04N 1/00408* (2013.01); *H04N 1/00477* (2013.01); *H04N 1/00973* (2013.01); *H04N 2201/0072* (2013.01); *H04N 2201/0074* (2013.01)
(58) Field of Classification Search
None
See application file for complete search history.

(56) References Cited

U.S. PATENT DOCUMENTS

| | | | | |
|---|---|---|---|---|
| 2006/0274368 A1* | 12/2006 | Imine | ..................... | G06K 15/00 358/1.15 |
| 2010/0014114 A1* | 1/2010 | Oosawa | ............. | G03G 15/5075 358/1.15 |
| 2010/0322661 A1* | 12/2010 | Yamamichi | ........ | H04N 1/00204 399/81 |
| 2011/0261405 A1* | 10/2011 | Ito | .......................... | G06F 3/1292 358/1.15 |
| 2013/0057883 A1* | 3/2013 | Ohshima | ................. | H04L 12/12 358/1.9 |
| 2015/0154482 A1* | 6/2015 | Kawai | ................... | G06F 3/1204 358/1.15 |

(Continued)

FOREIGN PATENT DOCUMENTS

JP 2009-296357 A 12/2009

*Primary Examiner* — Henok Shiferaw
(74) *Attorney, Agent, or Firm* — ScienBiziP, P.C.

(57) ABSTRACT

A terminal device includes a communicator capable of communicating with a plurality of image forming apparatuses capable of switching an operation mode between an energy-saving mode and a normal mode, and a controller, wherein the controller, from the plurality of image forming apparatuses via the communicator, receives information of each image forming apparatus including the operation mode, based on the information of each image forming apparatus, displays states of the operation modes of the image forming apparatuses, and sends a request signal, which switches the operation mode, via the communicator to the image forming apparatus selected from among the displayed image forming apparatuses.

8 Claims, 29 Drawing Sheets

(56) References Cited

U.S. PATENT DOCUMENTS

| | | | |
|---|---|---|---|
| 2015/0277810 A1* | 10/2015 | Fukasawa | G06F 3/1204 358/1.15 |
| 2016/0274828 A1* | 9/2016 | Oshima | G06F 3/1238 |
| 2018/0176403 A1* | 6/2018 | Ueda | G06F 3/1221 |

* cited by examiner

FIG. 3

| ADDRESS | OPERATION MODE INFORMATION |
|---|---|
| D0:12:34:56:78:9A | NORMAL MODE |
| D0:12:34:56:78:9B | NORMAL MODE |
| D0:12:34:56:78:9C | ENERGY-SAVING MODE |
| ⋮ | ⋮ |

FIG. 14

| ADDRESS | PRIORITY |
|---|---|
| D0:12:34:56:78:9A | 3 |
| D0:12:34:56:78:9B | 2 |
| D0:12:34:56:78:9C | 1 |
| ⋮ | ⋮ |

FIG. 17

| TERMINAL DEVICE ID | COMMUNICATION CONTENT | DATE AND TIME OF COMMUNICATION |
|---|---|---|
| dev1 | PRINT JOB RECEIVED | 2021/06/20 12:11:32 |
| dev2 | PRINT JOB RECEIVED | 2021/06/19 18:12:34 |
| dev1 | RECEIVE SETTING CHANGE REQUEST | 2021/06/19 11:47:29 |
| ⋮ | ⋮ | ⋮ |

FIG. 19

| ADDRESS | USED FUNCTION | DATE AND TIME OF USE |
|---|---|---|
| D0:12:34:56:78:9A | COPY | 2021/06/22 14:13:36 |
| D0:12:34:56:78:9B | SCAN | 2021/06/21 11:12:34 |
| D0:12:34:56:78:9C | COPY | 2021/06/20 15:47:29 |
| ⋮ | ⋮ | ⋮ |

TERMINAL DEVICE FOR CONTROLLING OPERATION MODE OF IMAGE FORMING APPARATUS, AND SYSTEM FOR CONTROLLING OPERATION MODE OF IMAGE FORMING APPARATUS BY USING TERMINAL DEVICE

BACKGROUND OF THE INVENTION

Field of the Invention

The present disclosure relates to a terminal device and the like.

Description of the Background Art

Conventionally, an image forming apparatus such as a printer and multi-function peripheral/printer (MFP) has been used. Further, some image forming apparatuses operate by switching their operation mode between a normal mode and an energy-saving mode that consumes less power than the normal mode.

Further, technologies have also been proposed for switching the operation mode from the energy-saving mode to the normal mode. For example, there has been proposed a technology in which when a multifunction peripheral/printer (selected unit) to which a process is requested is in the energy-saving mode, another multifunction peripheral/printer sends a wake-on request to the selected unit, and the selected unit executes a return operation to the normal mode according to the received wake-on request.

The above technology requires at least one MFP to be in the normal mode, and all image forming apparatuses cannot be in the energy-saving mode at the same time. Meanwhile, there exists another technology that switches the operation mode from the energy-saving mode to the normal mode and that uses a motion sensor thereby to switch (start up) the operation mode from the energy-saving mode to the normal mode when a user approaches. However, when the user approaches a location where a plurality of image forming apparatuses is placed in close proximity to each other, the plurality of image forming apparatuses, by detecting the user, starts up all of the a plurality of image forming apparatuses. As a result, even an image forming apparatus that the user does not wish to use is started up, resulting in wasteful power consumption, which is undesirable from an ecological standpoint. Thus, there is a problem that the image forming apparatus to be started up cannot be appropriately selected.

In view of the above issue, it is an object of the present disclosure to provide a terminal device and the like capable of appropriately switching an operation mode of an image forming apparatus.

SUMMARY OF THE INVENTION

So as to solve the above issue, a terminal device according to the present disclosure includes: a communicator capable of communicating with a plurality of image forming apparatuses capable of switching an operation mode between an energy-saving mode and a normal mode, and a controller, wherein the controller, from the plurality of image forming apparatuses via the communicator, receives information of each image forming apparatus including the operation mode, based on the information of each image forming apparatus, displays states of the operation modes of the image forming apparatuses, and sends a request signal, which switches the operation mode, via the communicator to the image forming apparatus selected from among the displayed image forming apparatuses.

An image forming apparatus according to the present disclosure includes: a communicator capable of communicating with a terminal device, and a controller, wherein the controller sends, to the terminal device, information of each image forming apparatus including an operation mode, from the terminal device via the communicator, receives a request signal that switches an operation mode from an energy-saving mode to a normal mode, and based on the request signal, switches the operation mode from the energy-saving mode to the normal mode.

A system according to the present disclosure includes: a plurality of image forming apparatuses, and a terminal device, wherein the image forming apparatuses each have a switcher that switches an operation mode between an energy-saving mode and a normal mode, the terminal device includes a receiver that, from the plurality of image forming apparatuses, receives information of each image forming apparatus including the operation modes, a display that, based on the information of each image forming apparatus, displays states of the operation modes of the image forming apparatuses, and a sender that sends a request signal, which switches the operation mode, to the image forming apparatus selected from among the displayed image forming apparatuses.

The present disclosure makes it possible to provide a terminal device and the like that can appropriately switch the operation mode of an image forming apparatus from an energy-saving mode to a normal mode.

BRIEF DESCRIPTION OF THE DRAWINGS

FIG. 3 illustrates the data structure of apparatus information in the first embodiment.

FIG. 14 illustrates the data structure of priority information in the second embodiment.

FIG. 17 illustrates the data structure of communication history information in the second embodiment.

FIG. 19 illustrates the data structure of a used function history in the second embodiment.

DESCRIPTION OF THE PREFERRED EMBODIMENTS

The following is description of embodiments for implementing the present disclosure with reference to the drawings. The following embodiments are each an example for illustrating the present disclosure, and the technical scope of the disclosure described in the claims is not limited to the following descriptions.

1. First Embodiment

1.1 Overall Structure

Figure 1:
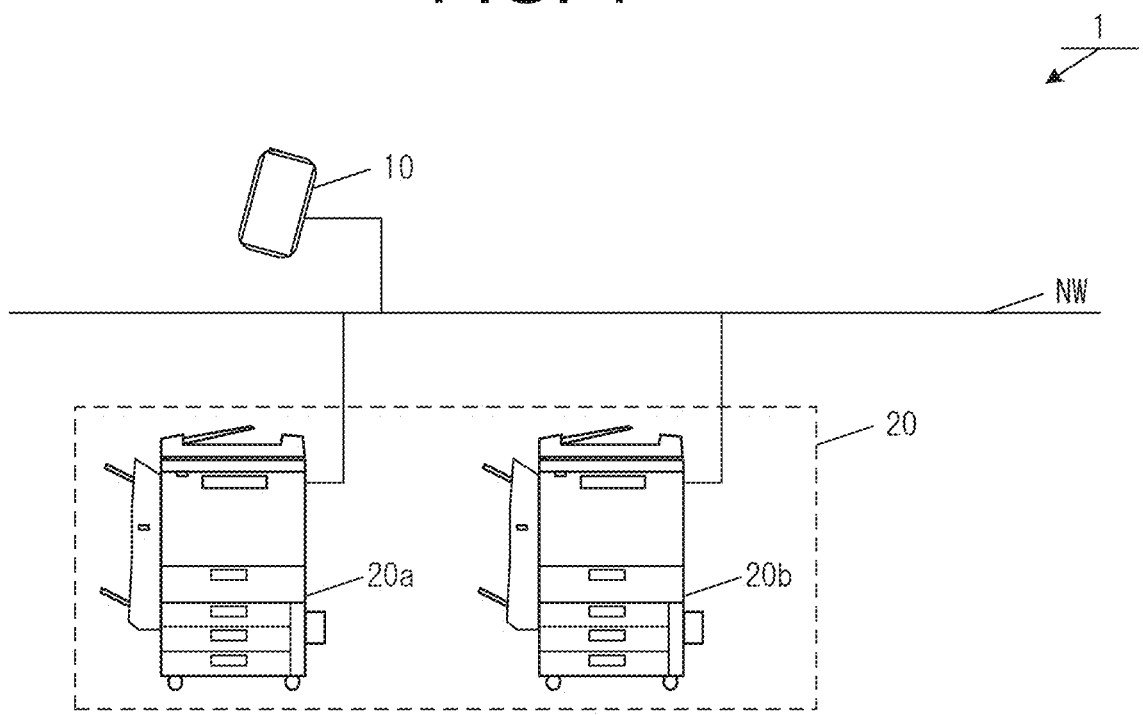
FIG. 1 illustrates the overall structure of a system in a first embodiment.

Referring to FIG. 1, a system 1 in the present embodiment will be described. As shown in FIG. 1, the system 1 in the present embodiment includes a terminal device 10 and an image forming apparatus 20 that is connected via a network NW. The network NW is, for example, a LAN (Local Area Network), but can also be the Internet and the like, as long as the units can exchange information with each other.

The terminal device 10 is an information processor composed of, for example, a smartphone, tablet, PC (Personal Computer), and the like. In particular, the terminal device 10 in the present embodiment is an external terminal device, such as a smartphone, that can operate the image forming apparatus 20.

The image forming apparatus 20 is a unit capable of forming (printing) a predetermined image on a recording medium such as recording paper. For example, the image forming apparatus 20 is a digital multi-function peripheral/printer (MFP) provided with functions such as copying, printing, scanning, and e-mail sending. As shown in FIG. 1, a plurality of image forming apparatuses 20 (20a, 20b) may be connected to the network NW.

Also, the image forming apparatus 20 of the present embodiment, with a main power supply being ON, switches an operation mode that corresponds to the state of power supply to each functional part of the image forming apparatus 20, and operates. The description will be made based on that the image forming apparatus 20 of the present embodiment has an operation mode that has a normal mode (during startup) that supplies power to each functional part of the image forming apparatus 20, and an energy-saving mode (during energy-saving) that supplies power only to the functional part necessary for the minimum operation. That is, the energy-saving mode consumes less power than the normal mode.

The normal mode may be a mode in which, when an operation or a process content is input by a user, power is immediately supplied to each functional part of the image forming apparatus 20 so as to accept the input operation or execute the input process content. Meanwhile, the energy-saving mode may be a mode in which, the power supply to an image input 220, an imager 230 and a display 240 of the functional parts provided in the image forming apparatus 20 is stopped, and the power is supplied to a communicator 290 to the extent that only a wired communication is allowed. In the present embodiment, the power is to be supplied such that the function for sending apparatus information of the image forming apparatus 20 to the terminal device 10 can operate even in the energy-saving mode. The apparatus information will be described below.

1.2 Functional Structure

1.2.1 Terminal Device

Figure 2:
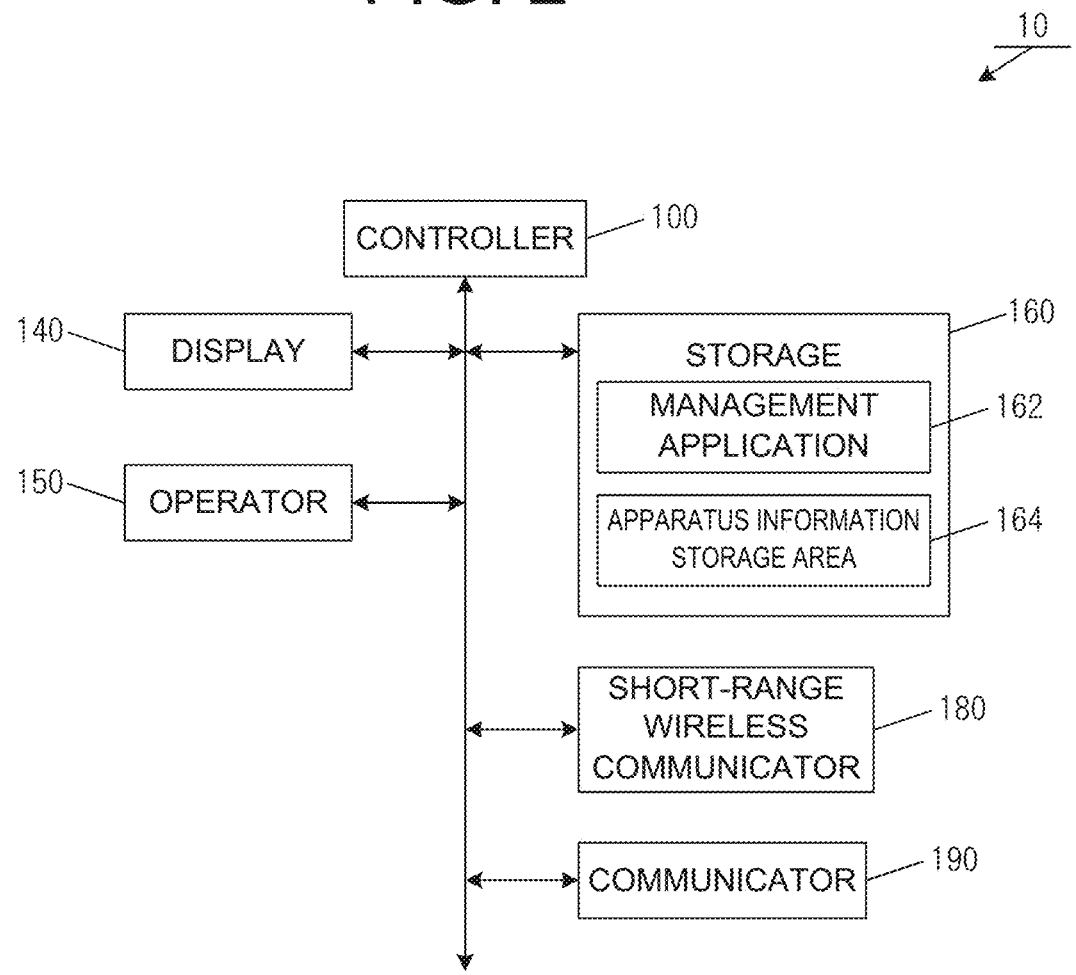
FIG. 2 illustrates the functional structure of the terminal device in the first embodiment.

Referring to FIG. 2, the functional structure of a terminal device 10 in the present embodiment will be described. As shown in FIG. 2, the terminal device 10 includes a controller 100, a display 140, an operator 150, a storage 160, a short-range wireless communicator 180, and a communicator 190.

The controller 100 controls the entire terminal device 10. The controller 100 reads out and executes various programs stored in the storage 160 thereby to realize various functions, and is composed of one or more calculators (e.g., CPU (Central Processor)). The controller 100 may also be configured as an SoC (System on a Chip) having a plurality of functions among those described below.

The display 140 displays various pieces of information. The display 140 is composed of, for example, an LCD (Liquid Crystal Display), an organic EL (electro-luminescence) display, a micro-LED (Light Emitting Diode) display, and the like.

The operator 150 accepts an operation from the user using the terminal device 10. The operator 150 is composed of a touch sensor or other input. The operator 150 is composed of a touch sensor or other input. The method of detecting input in the touch sensor can be any general detecting method, such as resistive, infrared, electromagnetically inductive, or capacitive. A touch screen in which the display 140 and the operator 150 are formed in one piece may be installed on the terminal device 10.

The storage 160 stores various programs and various data necessary for operating the terminal device 10. The storage 160 is composed of a storage such as SSD (solid state drive) and HDD (Hard Disk Drive) as a semiconductor memory.

The storage 160 stores a management application 162, and also secures an apparatus information storage area 164 as a storage area.

The management application 162 manages the image forming apparatus 20. The management application 162 changes the setting of the image forming apparatus 20, and sends data (processing data) related to the process to be executed by the image forming apparatus 20.

The apparatus information storage area 164 stores information (apparatus information) on the image forming apparatus 20 detected by the terminal device 10. The apparatus information includes, for example, as shown in FIG. 3, an address (e.g., "D0:12:34:56:78:9A") which is information (identification information) that can uniquely identify the image forming apparatus 20, and operation mode information (e.g., "normal mode") as information showing the operation mode of the image forming apparatus 20.

The short-range wireless communicator 180 executes a short-range wireless communication with another unit placed around the terminal device 10. The wireless communication method used by the short-range wireless communicator 180 may be any of Bluetooth (registered trademark), Bluetooth Low Energy (hereinafter, BLE), ZigBee (registered trademark), or a wireless communication method generally used for the short-range communication.

The present embodiment is described based on that, with the image forming apparatus 20, the terminal device 10 executes the short-range wireless communication by the BLE.

The communicator 190 communicates with an external unit. The communicator 190 is composed of, for example, a communicator such as an NIC (Network Interface Card) used in a wired/wireless LAN (Local Area Network), and a communication module that is connectable to LTE (Long Term Evolution)/LTE-A (LTE-Advanced)/LAA (License-Assisted Access using LTE)/5G line.

1.2.2 Image Forming Apparatus

Figure 4:
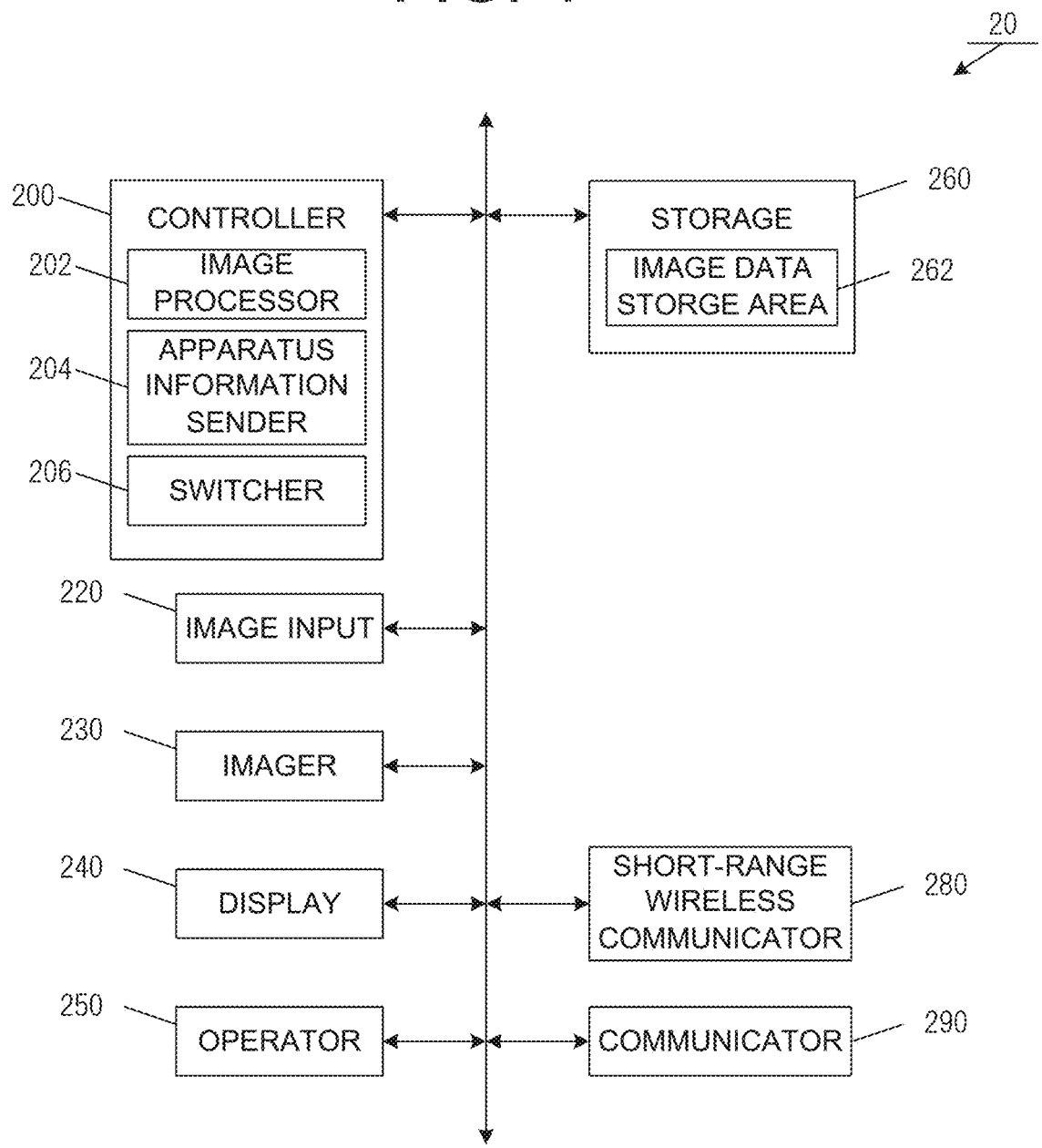
FIG. 4 illustrates the functional structure of an image forming apparatus in the first embodiment.

Referring to FIG. 4, the functional structure of the image forming apparatus 20 in the present embodiment will be described. As shown in FIG. 4, the image forming apparatus 20 includes a controller 200, an image input 220, the imager 230, the display 240, an operator 250, a storage 260, a short-range wireless communicator 280, and a communicator 290.

The controller 200 controls the entire image forming apparatus 20. The controller 200 reads out and executes various programs stored in the storage 260 thereby to realize various functions, and is composed of one or more calculators (e.g., CPUs).

The controller 200 executes the program stored in the storage 260 thereby to function as an image processor 202, an apparatus information sender 204, and a switcher 206.

The image processor 202 executes various image-related processes. For example, the image processor 202 executes a sharpening process and a tone conversion process on the image input by the image input 220.

The apparatus information sender 204 executes a process of sending, via the short-range wireless communicator 280, apparatus information of the image forming apparatus 20.

For example, the apparatus information sender 204 includes apparatus information, which includes operation mode information of the image forming apparatus 20, in advertising data (advertising packet), and periodically (e.g., at intervals of several hundred milliseconds to one second) executes broadcast sending. In this case, the apparatus information sender 204 may periodically send, via the short-range wireless communicator 280, a BLE communication packet that includes apparatus information in an advertising PDU (Packet Data Unit). The apparatus information sender 204 sends the apparatus information regardless of the operation mode of the image forming apparatus 20. With this, even when the operation mode is in the energy-saving mode, the apparatus information sender 204 can, to the terminal device 10, send the information showing the that the operation mode is in the energy-saving state.

It is sufficient if the apparatus information is shown in the entire advertising data. For example, it is sufficient that the apparatus information sender 204 sends the advertising PDU including the operation mode information and thereby shows the apparatus information by means of the image forming apparatus 20's identification information by the BLE and operation mode information included in the advertising PDU, as an entirety of the advertising data.

The switcher 206 switches the operation mode of the image forming apparatus 20 between the energy-saving mode and the normal mode. The switcher 206 executes an operation mode switching process that automatically switches the operation mode according to the state of the image forming apparatus 20. The operation mode switching process will be described below.

The image input 220 reads an original document and inputs data of the read image. For example, the image input 220 is composed of a scanner, such as CIS (Contact Image Sensor) or CCD (Charge Coupled Unit), provided with a unit that converts optical information into an electrical signal, and the image input 220 reads the original document placed on a mounting table of the image forming apparatus 20. The image input 220 may be configured with an interface (terminal) for reading out an image stored in an external storage medium such as USB (Universal Serial Bus) memory.

The imager 230 forms (prints) an image on recording media such as recording paper. The imager 230 is composed of, for example, a laser printer using an electrophotographic method.

The display 240 displays various pieces of information. The display 240 is composed of, for example, an LCD, an organic EL display, a micro LED display, or any other display.

The operator 250 accepts an operation of the user using the image forming apparatus 20. The operator 250 is composed of a hardware key (physical key, numeric key), a touch sensor, and any other input. A touch screen in which the display 240 and the operator 250 are formed in one piece may be installed on the image forming apparatus 20.

The storage 260 stores various programs and various data necessary for operating the image forming apparatus 20. The storage 260 is composed of a storage such as SSD and a HDD as a semiconductor memory.

The storage 260 secures, as a storage area, image data storage area 262 for storing image data of an image input by the image input 220. The image data is, for example, data (print data) representing an image to be formed by the imager 230.

The short-range wireless communicator 280 executes a wireless communication with any other unit placed around the image forming apparatus 20. Any communicating method that is capable of communicating with the terminal 10 may be used in the present embodiment.

The communicator 290 communicates with the external unit. The communicator 290 is composed of, for example, a communicator such as the NIC used in the wired/wireless LAN, and a communication module.

1.3 Flow of Processes 1.3.1 Overall Flow of Processes

Figure 5:
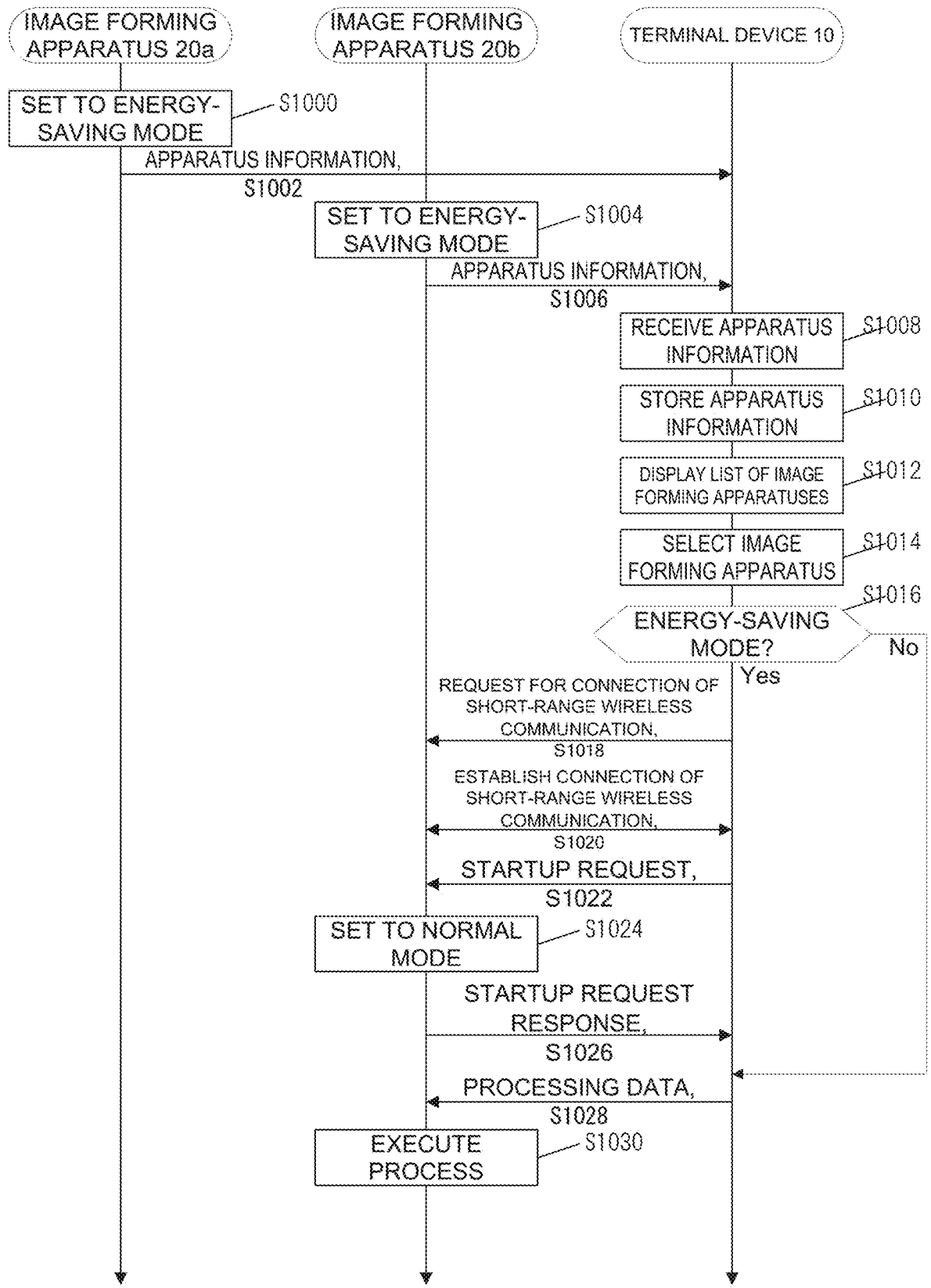
FIG. 5 is a sequence for illustrating the flow of processes in the first embodiment.

Referring to FIG. 5, processes executed by the terminal 10 and image forming apparatus 20 in the present embodiment will be described. In the following description, it is assumed that two image forming apparatuses 20 (image forming apparatus 20a and image forming apparatus 20b) are present around the terminal 10.

First, the image forming apparatus 20a sets the operation mode to the energy-saving mode in such a case where the time when no operation or no process content has been input exceeds a predetermined time (step S1000). Here, the image forming apparatus 20a periodically sends the apparatus information of the image forming apparatus 20 to the terminal 10 (step S1002). The apparatus information also includes the operation mode information. Therefore, the apparatus information sent by the image forming apparatus 20a shows that, according to the operation mode changed at S1000 from the normal mode to the energy-saving mode, the operation mode is the energy-saving mode.

Likewise, the image forming apparatus 20b sets the operation mode to the energy-saving mode (step S1004). Accordingly, the apparatus information sent by the image forming apparatus 20b shows that the operation mode is the energy-saving mode (step S1006).

Then, the terminal 10 receives the apparatus information, and detects the image forming apparatus 20 (step S1008). For example, setting, for a predetermined time, the terminal 10 to a state to receive the advertising packet via the short-range wireless communicator 180 allows the terminal 10 to receive the advertising packets sent from the image forming apparatus 20a and the image forming apparatus 20b.

Then, in the apparatus information storage area 164, the terminal 10 stores the apparatus information received in step S1008 (step S1010).

Then, the terminal 10 reads out the apparatus information from the apparatus information storage area 164, and displays a list of the image forming apparatus 20 on the display 140 (step S1012). The list of the image forming apparatus 20 includes, as list items, information showing the address, apparatus name, and a state of the operation mode of the image forming apparatus 20, for example.

Then, the terminal 10 selects the image forming apparatus 20 from the list displayed in step S1012 (step S1014). Here, selecting of the image forming apparatus 20 may be based on the user's operation, for example.

Then, based on the apparatus information of the image forming apparatus 20 (in the example in FIG. 5, image forming apparatus 20b) selected in step S1014, the terminal 10 determines whether or not the operation mode of the image forming apparatus 20 is the energy-saving mode (step S1016). When the operation mode of the image forming apparatus 20 is the energy-saving mode, the terminal 10 sends, via the short-range wireless communicator 180 to the image forming apparatus 20, a request for connection of the short-range wireless communication (step S1016; Yes→S1018).

Then, the terminal 10 and the image forming apparatus 20b that has received the request for connection of the short-range wireless communication establish the connection of the short-range wireless communication (step S1020).

Then, the terminal 10 sends a startup request via the short-range wireless communicator 180 (step S1022). The startup request is a request signal that switches the operation mode of the image forming apparatus 20 from the energy-saving mode (during energy-saving) to the normal mode (during starting up). The startup request is, for example, a BLE communication packet that includes information showing a request to switch the operation mode to the normal mode. This allows the user to start units such as the image forming apparatus 20.

Receiving the startup request from the terminal 10 via the short-range wireless communicator 280, the image forming apparatus 20 sets the operation mode to the normal mode (step S1024). Further, the image forming apparatus 20 sends a startup request response via the short-range wireless communicator 280 to the terminal 10 that sent the startup request (step S1026). The startup request response is a response to the startup request. The startup request response is, for example, a BLE communication packet that includes information showing that the operation mode has become the normal mode.

The terminal 10, by receiving the startup request response from the image forming apparatus 20, determines that the operation mode of the image forming apparatus 20 has become the normal mode, and sends the processing data to the image forming apparatus 20 (step S1028). The processing data may be sent by the wireless LAN via the communicator 190 or by the short-range wireless communication via the short-range wireless communicator 180. The image forming apparatus 20b executes the predetermined process that accords to the processing data received from the terminal 10 (step S1030).

When determining in step S1016 that the operation mode of the selected image forming apparatus 20 is the normal mode, the terminal 10 omits the processes in step S1018 to step S1022 and step S1026 (step S1016; No). In this case, the terminal 10 sends the processing data without sending the startup request to the image forming apparatus 20.

1.3.2 Process of Image Forming Apparatus

Figure 6:
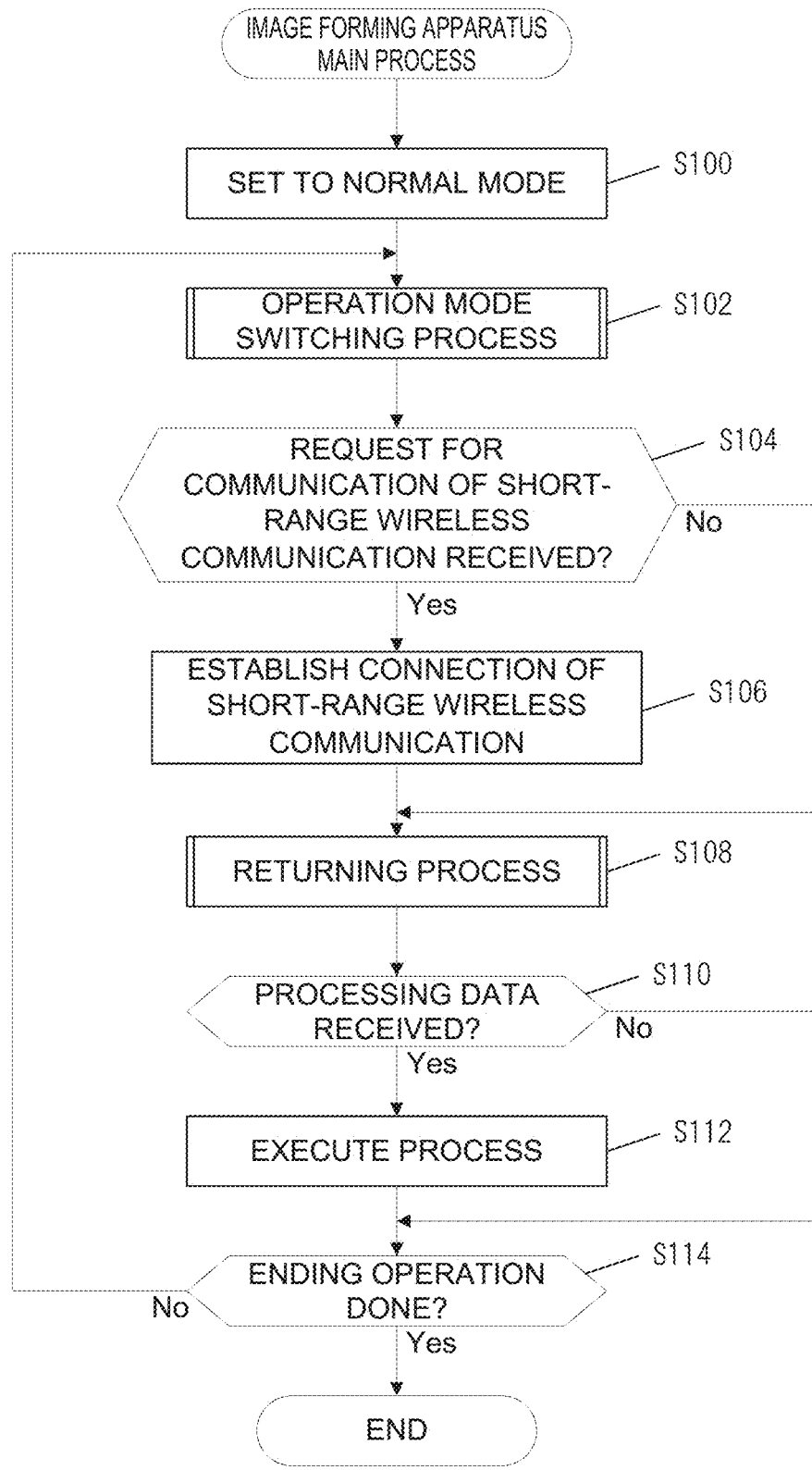
FIG. 6 is a flow for illustrating the flow of processes of the image forming apparatus in the first embodiment.
Figure 7:
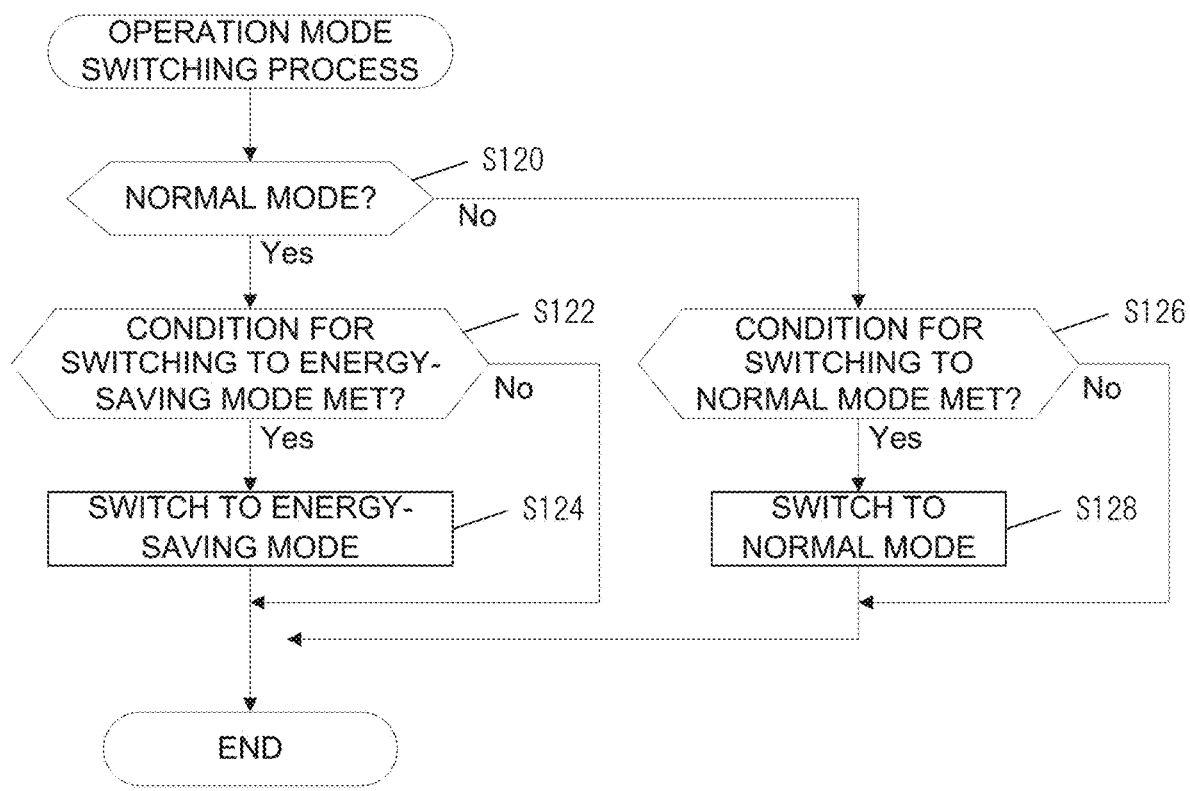
FIG. 7 is a flow for illustrating the flow of an operation mode switching process in the first embodiment.
Figure 8:
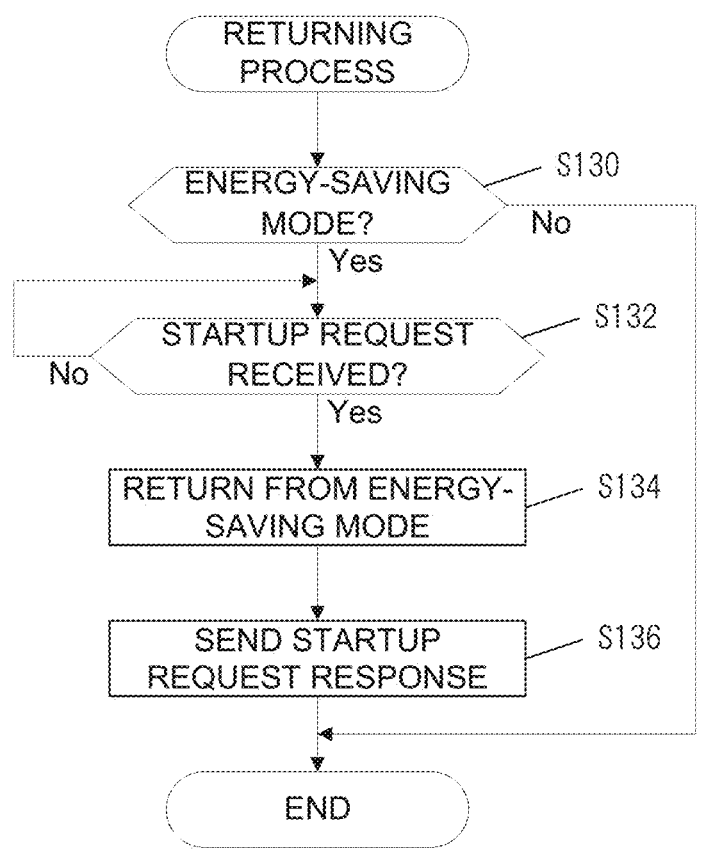
FIG. 8 is a flow for illustrating the flow of the returning processes in the first embodiment.

Referring to FIGS. 6 through 8, the flow of processes executed by the image forming apparatus 20 will be described. The processes shown in FIGS. 6 through 8 are executed by the image forming apparatus 20 reading out the program stored in the storage 260.

First, referring to FIG. 6, the main process of the image forming apparatus 20 will be described. The main process is executed from the time point when the power of the image forming apparatus 20 is turned on. First, the controller 200 (switcher 206) sets the image forming apparatus 20 to the normal mode (step S100).

Then, the controller 200 (switcher 206) executes the operation mode switching process (step S102). The operation mode switching process will be described below.

Then, the controller 200 determines whether or not having received, from the terminal 10 via the short-range wireless communicator 280, the request for connection of the short-range wireless communication (step S104). When having received the request for connection of the short-range wireless communication, the controller 200, together with the terminal 10 that sent the connection request, establishes the connection of the short-range wireless communication (step S104; Yes→step S106).

Then, according to the startup request sent from the terminal 10, the controller 200 executes a returning process that returns the operation mode from the energy-saving mode to the normal mode (step S108). The returning process will be described below.

In step S104, when not having received, from the terminal 10, the request for connection of the short-range wireless communication, the controller 200 omits the processes of step S106 and step S108 (step S104; No).

Then, when having received the processing data from the terminal 10 via the short-range wireless communicator 280 or the communicator 290, the controller 200 executes the process that is based on the processing data received from the terminal 10 (step S110; Yes→step S112). When not having received any processing data from the terminal 10, the controller 200 omits the process in step S112 (step S110; No).

Then, when an ending operation to end the image forming apparatus 20 is executed, the controller 200 ends the processes shown in FIG. 6 (step S114; Yes). The ending operation is, for example, an operation in which a button to turn off the power of the image forming apparatus 20 is selected. When the end operation is not executed, the controller 200 returns to step S102 (step S114; No→step S102).

1.3.3 Operation Mode Switching Process

Referring to FIG. 7, the flow of the operation mode switching process executed by the switcher 206 will be described. First, the switcher 206 determines whether or not the operation mode of the image forming apparatus 20 is the normal mode (step S120). When the operation mode of the image forming apparatus 20 is the normal mode, the switcher 206 determines whether or not the condition for setting the operation mode to the energy-saving mode is met (step S120; Yes→step S122). The condition for setting the operation mode to the energy-saving mode is, for example, when the time when no operation is input via the operator 250 exceeds a predetermined time, or when the time when no process content is received via the communicator 290 exceeds a predetermined time.

When the condition for switching the operation mode to the energy-saving mode is met, the switcher 206 switches the operation mode of the image forming apparatus 20 from the normal mode to the energy-saving mode (step S122; Yes→step S124). With the operation mode switched to the energy-saving mode, the controller 200 stops the power supply to the image input 220, the imager 230 and the display 240, or decreases the power supply to such an extent that only enough power to enable a wired communication is supplied to the communicator 290.

Meanwhile, when the condition for switching the operation mode to the energy-saving mode is not met, the switcher 206 omits the process in step S124 and keeps the image forming apparatus 20's operation mode remaining in the normal mode (step S122; No).

Meanwhile, when determining in step S120 that the operation mode of the image forming apparatus 20 is in the energy-saving mode, the switcher 206 determines whether or not the condition for setting the operation mode to the normal mode is met (step S120; No→step S126). The condition for setting the operation mode to the normal mode is, for example, when an operation is input via the operator 250, or when the process content is input via the wired communication via the communicator 290.

When the condition for setting the operation mode to the normal mode is met, the switcher 206 switches the operation mode of the image forming apparatus 20 from the energy-saving mode to the normal mode (step S126; Yes→step S128). With the operation mode switched to the normal mode, the controller 200 supplies power to all functional parts provided in the image forming apparatus 20. In the present embodiment, setting the operation mode of the image forming apparatus 20 from the energy-saving mode to the normal mode is also referred to as causing to make a return from energy-saving.

Meanwhile, when the condition for switching the operation mode to the normal mode is not met, the switcher 206 omits the process in step S128, and keeps the image forming apparatus 20's operation mode remaining in the energy-saving mode (step S126; No).

1.3.4 Returning Process

The flow of the returning processes is described referring to FIG. 8. First, the controller 200 determines whether or not the operation mode of the image forming apparatus 20 is the energy-saving mode (step S130). When the operation mode of the image forming apparatus 20 is the energy-saving mode, the controller 200 determines whether or not receiving the startup request from the terminal 10 via the short-range wireless communicator 280 (step S130; Yes→step S132).

The controller 200 repetitively executes step S132 until receiving the startup request from the terminal 10 (step S132; No). Meanwhile, when having received the startup request from the terminal 10, the controller 200 (switcher 206) switches the operation mode of the image forming apparatus 20 from the energy-saving mode to the normal mode (step S132; Yes→step S134). This causes the controller 200 to cause the image forming apparatus 20 to make the return from energy-saving. Then, the controller 200 sends the startup request response via the short-range wireless communicator 280 to the terminal 10 (step S136).

When the operation mode of the image forming apparatus 20 is the normal mode in step S130, the controller 200 omits the processes from step S132 to step S136 (step S130; No).

In parallel with executing of the above processes, the controller 200 (apparatus information sender 204) periodically sends the image forming apparatus 20's operation mode information to the terminal 10. Therefore, when the operation mode is switched due to the operation mode switching process or the returning process, the image forming apparatus 20 can send the post-switched operation mode to any other unit.

In addition to the processes, the controller 200 of the image forming apparatus 20, according to the operation mode, supplies, stops, or adjusts the power supply to each functional part of the image forming apparatus 20. For example, when the operation mode is the normal mode, the controller 200 controls the power supply to all functional parts provided in the image forming apparatus 20. Meanwhile, when the operation mode is the energy-saving mode, the controller 200 controls the power supply to a predetermined functional part among the functional parts provided in the image forming apparatus 20.

1.3.5 Terminal

Figure 9:
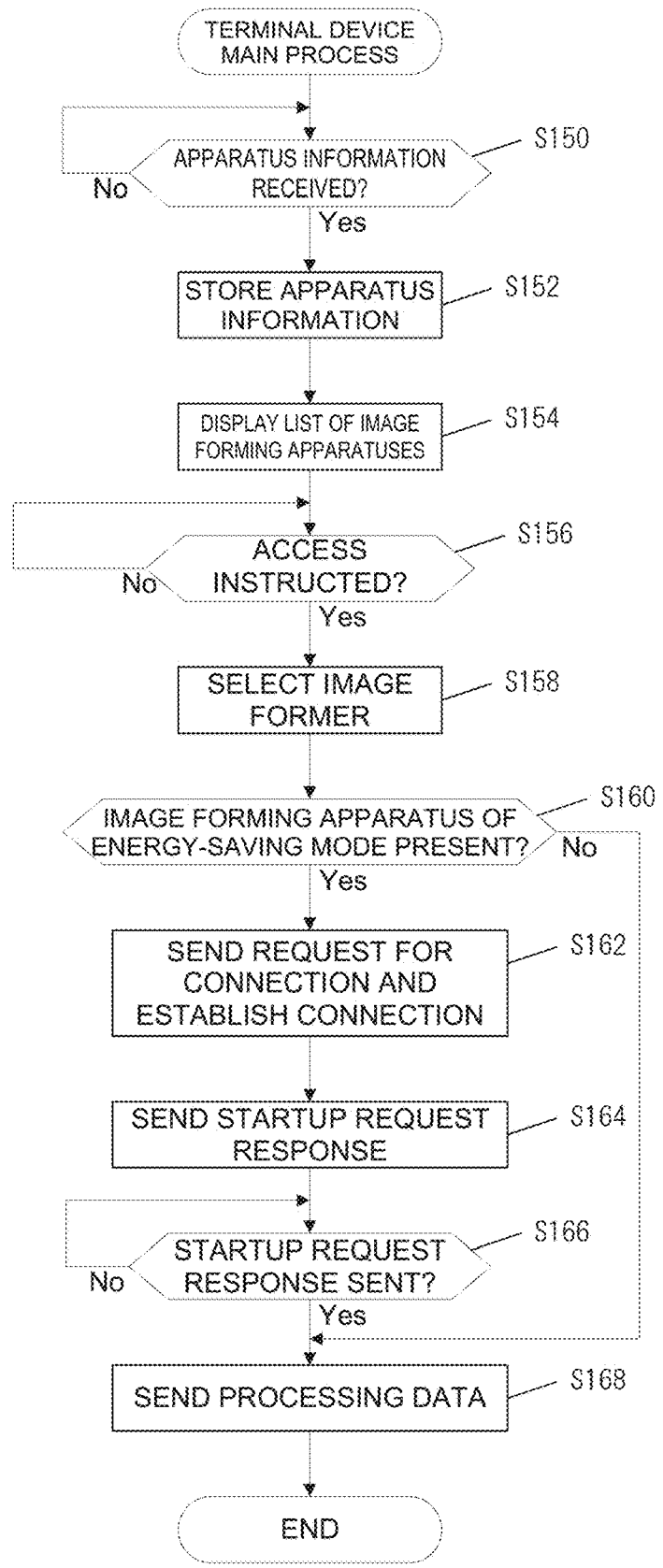
FIG. 9 illustrates the flow of the terminal device in the first embodiment.

The flow of main processes of the terminal 10 will be described below with reference to FIG. 9. The process shown in FIG. 9 is executed by the controller 100 reading out the management application 162.

First, the controller 100 determines whether or not having received the apparatus information (e.g., an advertising packet) from the image forming apparatus 20 (step S150). When having received the apparatus information from the image forming apparatus 20, the controller 100 detects the image forming apparatus 20, and stores the apparatus information (step S150; Yes→step S152). Also, the controller 100 reads out the apparatus information, and displays a list of image forming apparatuses on the display 140 (step S154). For example, for each apparatus information, the controller 100 displays the address and the operation mode information that are included in the apparatus information.

In this case, the controller 100 may display the apparatus name of the image forming apparatus 20. The apparatus name of the image forming apparatus 20 may or may not be included in the apparatus information. When the apparatus information does not include the apparatus name of the image forming apparatus 20, a table preliminarily storing the correspondence between the address of the image forming apparatus 20 and the apparatus name of the image forming apparatus 20 is stored in the storage 160 of the terminal 10 or in a storage of any other unit (for example, a server). In this case, the terminal 10 having received the apparatus information, by reading out the table, can acquire the apparatus name that is included in the apparatus information and that corresponds to the address of the image forming apparatus 20.

Here, for each item in the list, the controller 100 may display information or a picture (icon) for identifying whether the operation mode of the image forming apparatus 20 corresponding to the item is the normal mode or the energy-saving mode. For example, the controller 100, for the item of the image forming apparatus 20 in the energy-saving mode as the operation mode, displays a picture (icon) showing the energy-saving mode, and for the item of the image forming apparatus 20 in the energy-saving mode as the operation mode, does not display a picture (icon) showing the operation mode. With this, the controller 100 can cause the image forming apparatus, which is in the energy-saving mode as the operation mode, to stand out.

Note that the processes from step S150 to step S154 correspond to the processes from S1008 to S1012 in FIG. 5.

Then, the controller 100 determines whether or not an instruction to access the image forming apparatus 20 has been made by the user selecting, from the list displayed in step S154, one or more of the image forming apparatuses 20 as a to-be-accessed image forming apparatus 20 (step S156). Accessing the image forming apparatus 20 refers to changing the setting of the image forming apparatus 20 or sending the processing data to the image forming apparatus 20.

When being instructed by the user to access the image forming apparatus 20, the controller 100 selects the access destination image forming apparatus 20 (step S156; Yes→step S158). Here, the controller 100 may select, as the access destination image forming apparatus 20, the image forming apparatus 20 selected by the user.

The controller 100 determines whether or not, among the image forming apparatuses 20 selected in step S158, the image forming apparatus 20 in the energy-saving mode as the operation mode is present (step S160). When there is the image forming apparatus 20 whose operation mode is in the energy-saving mode, the controller 100 sends, via the short-range wireless communicator 180 to the image forming apparatus 20 in the energy-saving mode, the request for connection of the short-range wireless communication, and establishes, together with the image forming apparatus 20, the connection of the short-range wireless communication (step S160; Yes→step S162).

Then, the controller 100 sends the startup request via the connection established in step S162 (step S164). Also, the controller 100 determines whether or not the startup request response is received from the image forming apparatus 20 that sent the startup request via the connection established in step S162 (step S166).

When having received the startup request response, the controller 100 sends the processing data to the image forming apparatus 20 via the short-range wireless communicator 180 or the communicator 190 (step S166; Yes→step S168). When not having received the startup request response, the controller 100 repeats the process of step S166 (step S166; No).

For the process in step S168, the controller 100 sends the processing data after the operation modes of all image forming apparatuses 20 selected in step S160 have been changed to the normal modes. The controller 100 may send the processing data in the order from the image forming apparatus 20 whose operation mode has changed to the normal mode. Also, the controller 100, after executing step S158, may preliminarily send the processing data to the image forming apparatus 20 whose operation mode is already in the normal mode.

Also, the processing data to be sent to the image forming apparatus 20 can be acquired by the controller 200 based on the user's operation at any time before executing of the process of step S168.

When failing to receive the startup request response within the predetermined time in step S166, the controller 100 may omit the process of sending the processing data to the image forming apparatus 20 that failed to receive the startup request response. If even only one image forming apparatus 20 should fail to receive the startup request response within the predetermined time in step S166, the controller 100, from step S150, may re-execute the processes described in FIG. 9.

1.4 Operation Example

Figure 10:
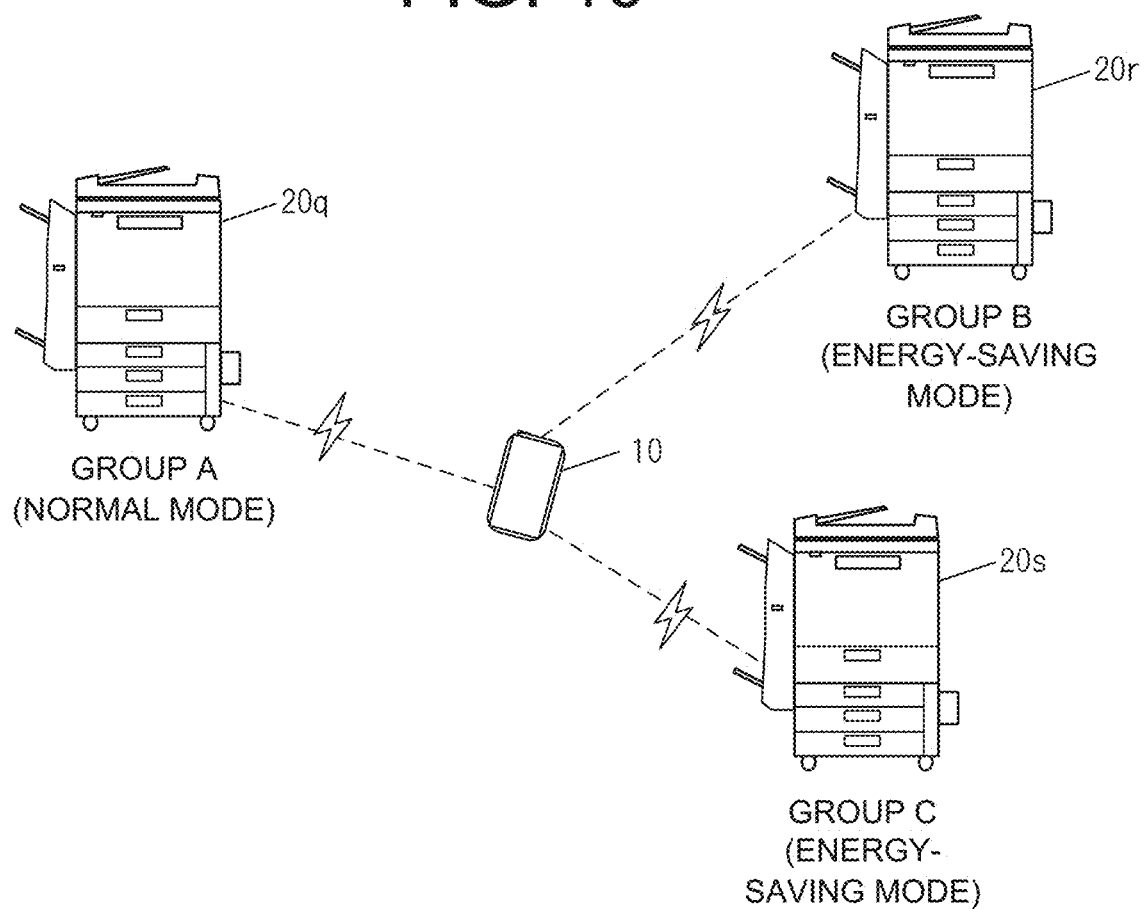
FIG. 10 illustrates an operation example in the first embodiment.

Next, an operation example of the present embodiment will be described. FIG. 10 shows an example seen when the terminal 10 detects the image forming apparatus 20.

As shown in FIG. 10, the terminal 10 is surrounded by an image forming apparatus 20q (apparatus name: group A), an image forming apparatus 20r (apparatus name: group B), and an image forming apparatus 20s (apparatus name: group C). The operation mode of the image forming apparatus 20q is the normal mode, and the operation mode of each of the image forming apparatus 20r and the image forming apparatus 20s is the energy-saving mode.

The three image forming apparatuses 20 periodically send the advertising packet of the BLE. The advertising packet includes, for example, a preamble, access address, PDU (Packet Data Unit), and CRC (Cyclic Redundancy Check).

In the present embodiment, the image forming apparatus 20 may be identified based on, for example, an advertiser address included in the advertising packet. The advertising PDU may include identification information such as a serial number of the image forming apparatus 20, and the image forming apparatus 20 may be identified based on the identification information included in the advertising PDU.

Also, by sending the operation mode information included in the advertising packet, the image forming apparatus 20 may send the operation mode information to the terminal 10. The terminal 10 may acquire the operation mode information from the received advertising packet. The terminal 10 acquires the apparatus information of the image forming apparatus 20 from the acquired advertising packet, and stores the apparatus information in the apparatus information storage area 164.

Figure 11:
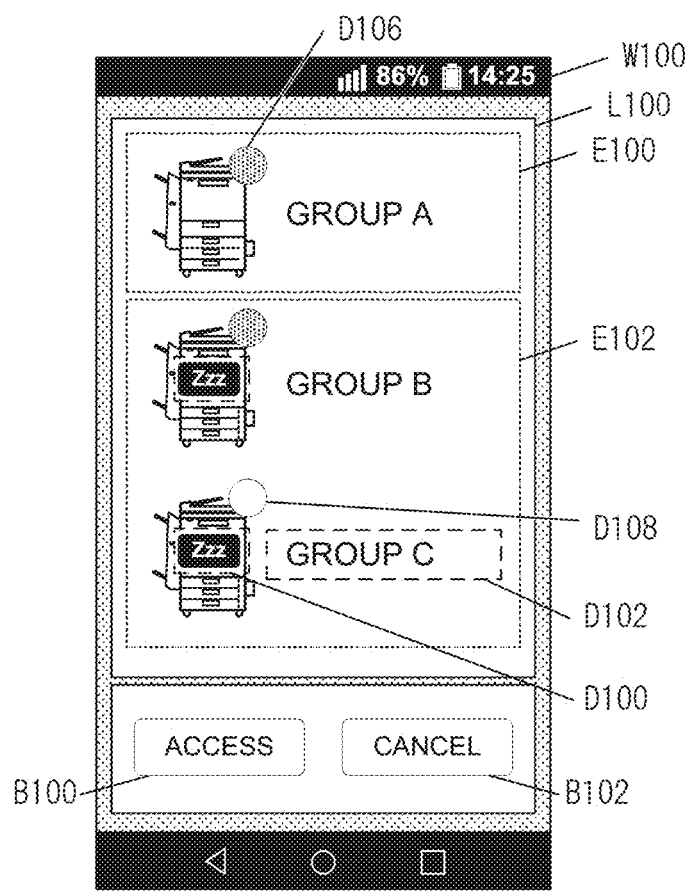
FIG. 11 illustrates the operation example in the first embodiment.

FIG. 11 shows an example of a display screen W100 that shows a list of the image forming apparatuses 20 detected by the terminal 10. The display screen W100 includes a list L100 that displays information displaying the information of the image forming apparatus 20 detected by the terminal 10, a button B100 for instructing an access to the selected image forming apparatus 20, and a button B102 for canceling the access to the image forming apparatus 20.

For each of the detected image forming apparatuses 20, the list L100 displays the state of operation mode of the image forming apparatus 20 and the apparatus name of the image forming apparatus 20. For example, the example in FIG. 11 shows an identification indication showing the state of the operation mode of the image forming apparatus 20 (e.g., identification indication D100 showing the energy-saving mode) and the apparatus name of the image forming apparatus 20 (e.g., apparatus name (identification indication) D102).

Here, the identification indication showing the state of the operation mode is, for example, a predetermined image, icon, symbol, or character. In the example of FIG. 11, the fact that the image forming apparatus 20 is the one that is in the energy-saving as the operation mode is shown as an icon by the identification indication D100. Based on whether or not the identification indication D100 is displayed, the user can distinguish whether the operation mode of the image forming apparatus 20 is the normal mode or the energy-saving mode.

It is sufficient if the list L100 displays the identification indication that works to distinguish the state of the operation mode of the image forming apparatus 20. For example, the identification indication may be displayed only on the image forming apparatus 20 in the normal mode as the operation mode. According to the operation mode of the image forming apparatus 20, any one of the identification indications, one showing the normal mode and the other showing the energy-saving mode, may be displayed. When the operation mode of the image forming apparatus 20 is the normal mode, the icon of the image forming apparatus 20 may be displayed in a normal manner, and when the operation mode is the energy-saving mode, the icon of the image forming apparatus 20 may be displayed in a grayed-out manner.

Also, the list L100 includes, for each of the image forming apparatuses 20, a display (e.g., an indication D106 and an indication D108 in FIG. 11) showing whether or not the image forming apparatus 20 is the one selected by the user.

The display showing whether or not the image forming apparatus 20 is selected by the user may be, for example, a predetermined image, an icon, a symbol, a character or a check box, or may be a background color of an item in the list L100, or the presence or absence of decoration on the character.

In the example in FIG. 11, the indication D106 by the symbol of a colored circle shows that the image forming apparatus 20 was selected by the user, and the indication D108 by the symbol of an uncolored circle shows that the image forming apparatus 20 was not selected by the user. By selecting the image forming apparatus 20 (e.g., tapping an item in the list L100), the user can switch between selecting and not selecting the image forming apparatus 20. Also, the user, by looking at the circle symbol, can distinguish whether or not the image forming apparatus 20 is the one that the user has selected.

For the list L100, as shown in FIG. 11, the image forming apparatus 20 in the normal mode as the operation mode is preferentially displayed in an area E100 at the top (upper) of the list, and the image forming apparatus 20 in the energy-saving mode as the operation mode is displayed in an area E102 at the bottom (lower) of the list. Thus, when a part of the image forming apparatus 20 is in the normal mode (during starting up) and another part of the image forming apparatus 20 is in the energy-saving mode (during energy-saving), information of the image forming apparatus 20 in the normal mode may be preferentially displayed.

The user selects, from the list L100, one or more of the to-be-accessed image forming apparatuses 20, and then selects the button B100, making it possible to access the selected image forming apparatus 20.

Figure 12A:
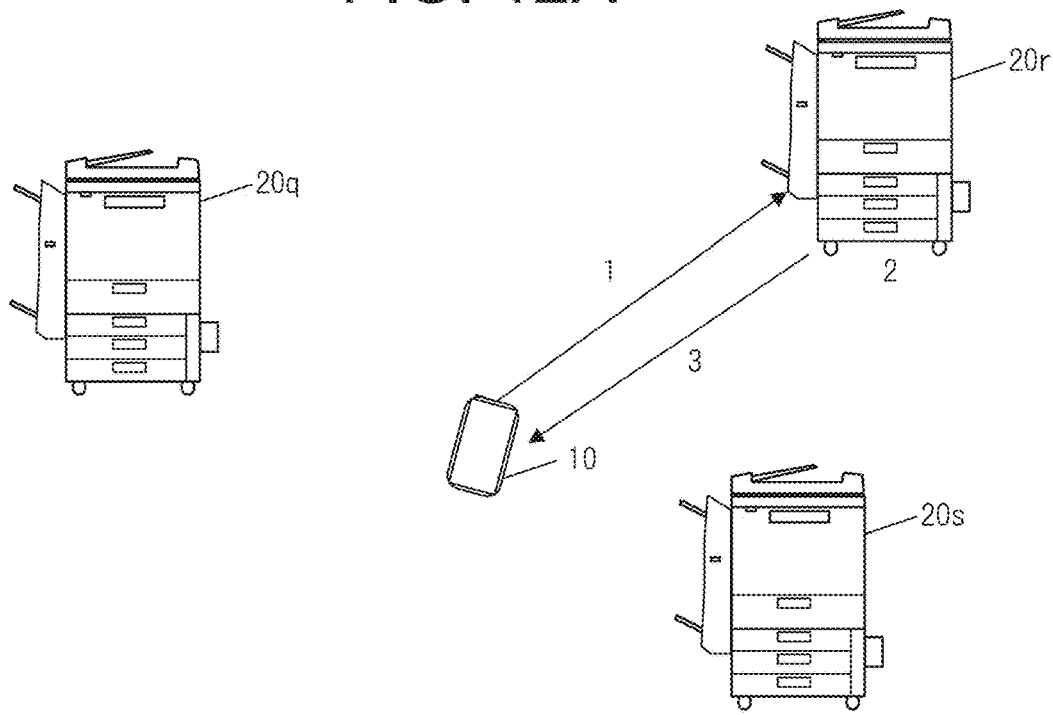
FIGS. 12A and 12B illustrate the operation example in the first embodiment.

FIG. 12A shows an example of causing the image forming apparatus 20 to make the return from energy-saving. It is assumed that the image forming apparatus 20q and the image forming apparatus 20r are those selected by the user. It is assumed that the image forming apparatus 20r was in the energy-saving mode as the operation mode.

In this case, (1) the startup request is sent from the terminal 10 to the image forming apparatus 20r, (2) the image forming apparatus 20r returns to the normal mode by making the return from energy-saving, and (3) the image forming apparatus 20r sends the startup request to the terminal 10.

Figure 12B:
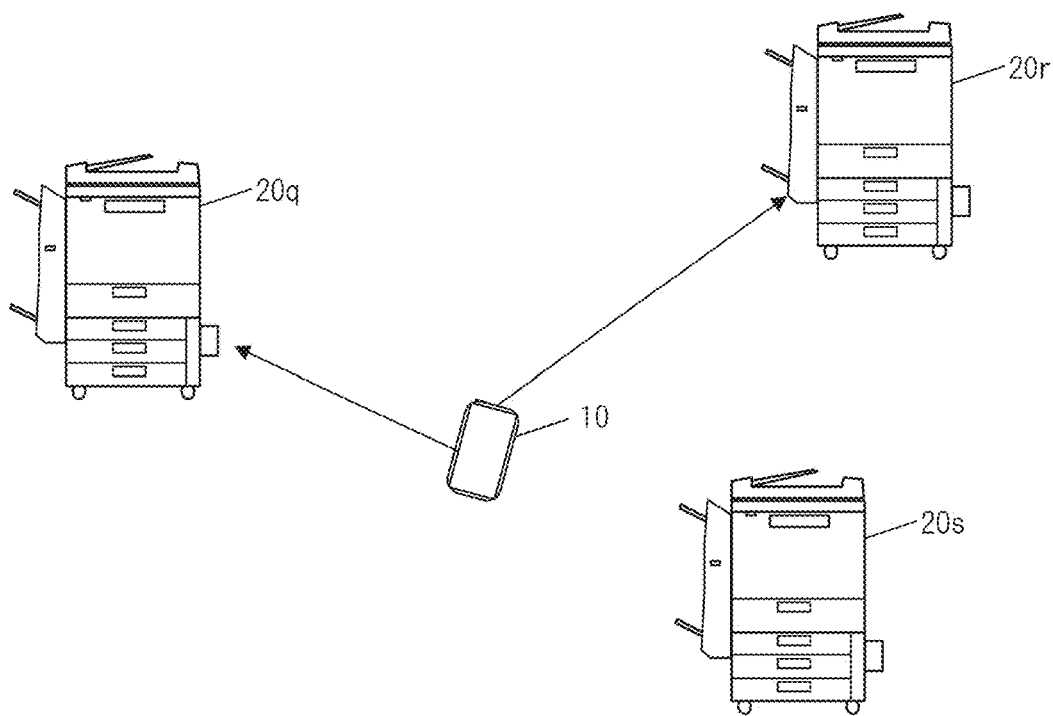

By receiving the startup request response from the image forming apparatus 20r, the terminal 10 can detect that the operation mode of the image forming apparatus 20r has become the normal mode. Then, as shown in FIG. 12B, the terminal 10 sends the processing data to each of the image forming apparatus 20q and the image forming apparatus 20r.

In this way, the terminal of the present embodiment receives, from one or more image forming apparatuses, the apparatus information including the operation mode information, and displays the states of the operation modes of the plurality of image forming apparatuses, thereby allowing the user to select one or more image forming apparatuses. Here, the terminal sends, to one or more image forming apparatuses selected by the user, the request signal that switches the operation mode to the normal mode, thereby making it possible cause only the user-desired image forming apparatus to make the return from energy-saving.

Here, regardless of the operation mode, the image forming apparatus of the present embodiment sends the operation mode information to the terminal and receives the startup request thereby to make the return from energy-saving. Therefore, the present embodiment does not require an image forming apparatus in the normal mode as the operation mode. With this, the terminal of the present embodiment can be detected even if all the operation modes of the surrounding image forming apparatuses are the energy-saving modes (during energy-saving).

When there is a plurality of image forming apparatuses in the energy-saving mode, the terminal of the present embodiment, at the time of accessing the image forming apparatus from the terminal, determines (selects), based on the user's operation, which image forming apparatus to cause to make the return from energy-saving. Therefore, the terminal of the present embodiment can cause only one or more image forming apparatuses selected by the user to make the return from energy-saving (can appropriately select the image forming apparatus to cause to make the return from energy-saving), rather than all detected image forming apparatuses, making it possible to suppress the power consumption of the image forming apparatuses. With this, the present embodiment, even when a plurality of image forming apparatuses are placed in close proximity to each other, prevents a problem such as the wasteful consumption of power of the image forming apparatus that the user does not wish to use, which consumption is attributable to all the image forming apparatuses, for which the user is detected by the motion sensor, being in the normal mode thereby to start up.

The terminal of the present embodiment uses the short-range wireless communication thereby to detect the image forming apparatus placed in the surrounding area, and allows the user to select the to-be-accessed image forming apparatus. With this, the terminal can prevent the user from wrongly causing the operation mode of the image forming apparatus not in the surrounding area to make the return from energy-saving.

2. Second Embodiment

Then, a second embodiment will be described below. The second embodiment is an embodiment in which, when the terminal lists the image forming apparatuses in the first embodiment, priority is set for the image forming apparatuses and information of the image forming apparatuses is displayed according to the priority. The present embodiment has replaced FIG. 2 of the first embodiment with FIG. 13. The same functional parts are given the same symbols, and description thereof is to be omitted.

2.1 Functional Structure of Terminal

Figure 13:
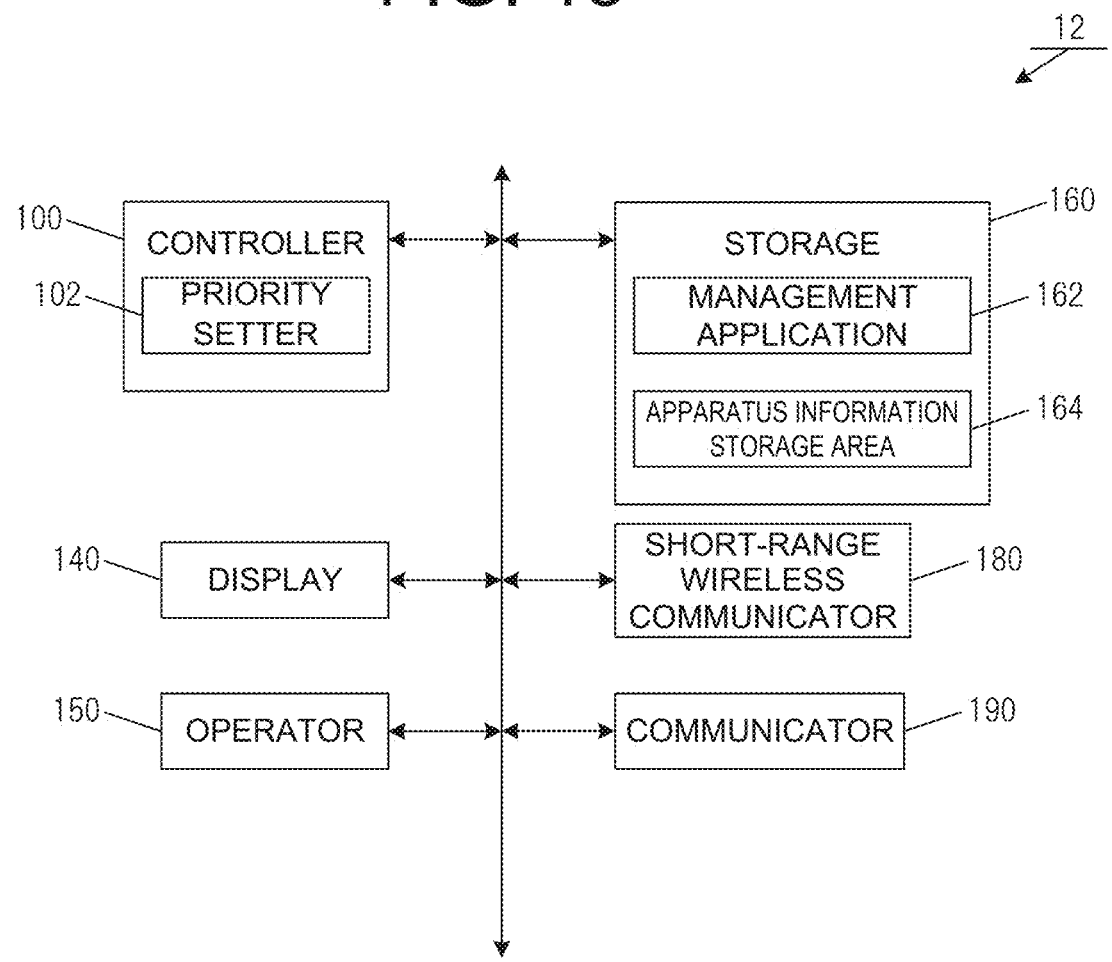
FIG. 13 illustrates the functional structure of the terminal device in a second embodiment.

In the present embodiment, the system 1 shown in FIG. 1 of the first embodiment includes, instead of the terminal 10, a terminal 12 with the configuration shown in FIG. 13.

As shown in FIG. 13, the terminal 12 is further provided with a priority setter 102 in addition to the configuration of the terminal 10. The priority setter 102 functions when the controller 100 executes the program stored in the storage 160. The priority setter 102 sets the priority for the image forming apparatuses 20.

2.2 Flow of Processes

In the present embodiment, the controller 100 (priority setter 102) of the terminal 12, before displaying the information of the image forming apparatus 20 based on the apparatus information, sets the priority for the apparatus information. Also, in the process of S1012 in FIG. 5 and S154 in FIG. 9, the controller 100 of the terminal 12 displays the information of the image forming apparatus 20 based on the apparatus information in the order of priority set for the apparatus information. The following is a description of five methods including the first to fifth methods for setting the priority. Also, the flow of processes according to the priority setting method will be described.

2.2.1 Method of Pre-Setting Priority

The first method is to pre-set the priority at the terminal 12. When the first method is used, the terminal 12 preliminarily stores, in the storage 160, the information showing the priority of the image forming apparatus 20 (priority information). The priority information includes, for example, as shown in FIG. 14, the address of the image forming apparatus 20 (e.g., "D0:12:34:56:78:9A") and the priority of the image forming apparatus 20 (e.g., "1"). The priority is, for example, a value greater than or equal to 1, and a smaller value shows a higher priority.

Figure 15:
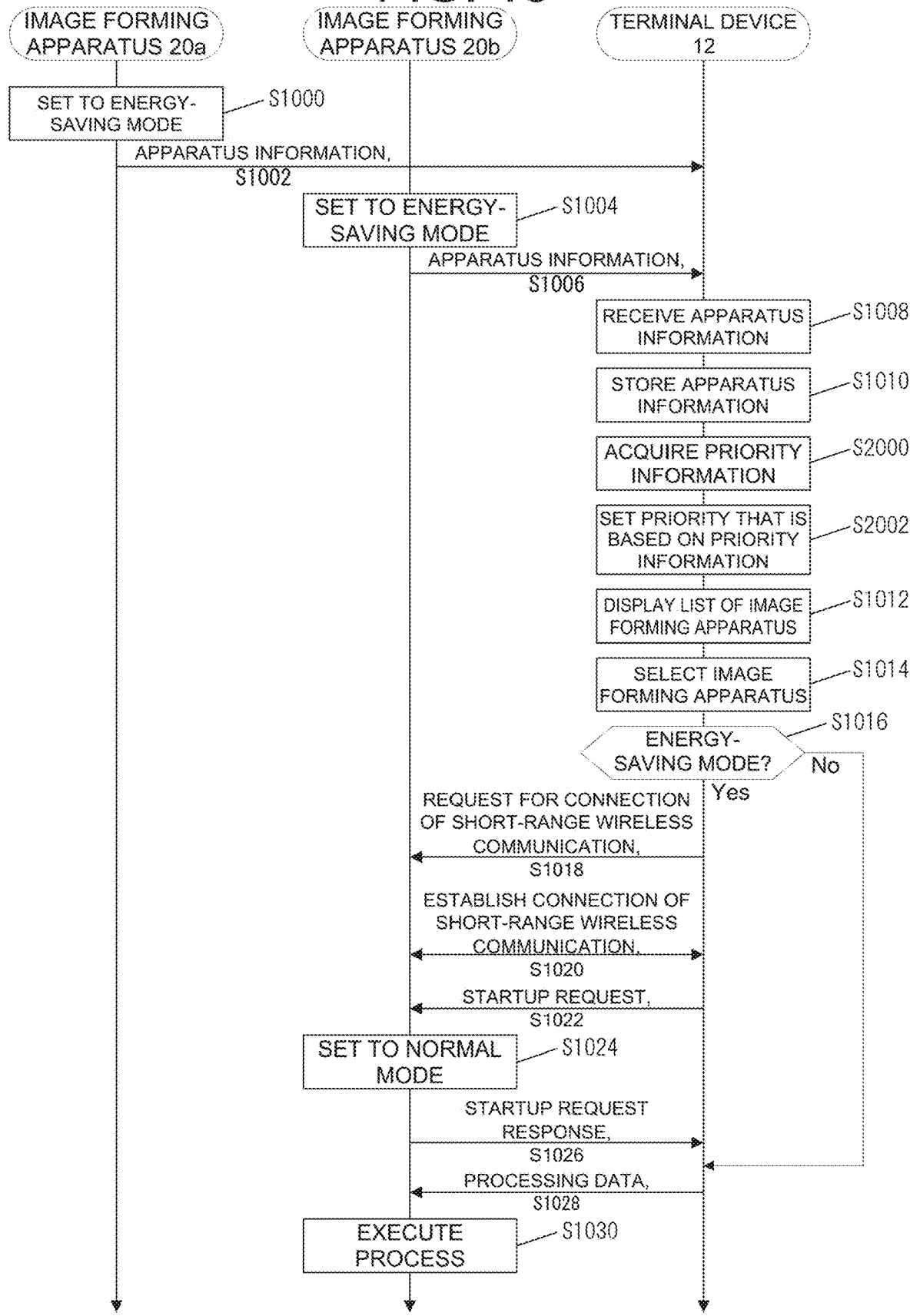
FIG. 15 is a sequence for illustrating an example of the flow of processes in the second embodiment.

FIG. 15 illustrates processes executed by the terminal 12 and the image forming apparatus 20 when the first method is used. FIG. 15 replaces FIG. 5, and the same processes as those described in FIG. 5 are given the same symbols as in FIG. 5, and description thereof is to be omitted.

The controller 100 of the terminal 12 stores the apparatus information (step S1010). Then, the controller 100 (priority setter 102) acquires the priority information from the storage 160 (step S2000). Also, the controller 100 (priority setter 102) reads out the priority that corresponds to the address included in the apparatus information, and, for the apparatus information, sets the priority stored in the priority information (step S2002).

This allows the controller 100 to list, in step S1012, the information of the detected image forming apparatus 20 (apparatus name and operation mode) in the order of the pre-set priority. The first method allows the user to preferentially display the normally-used image forming apparatus 20.

Figure 16:
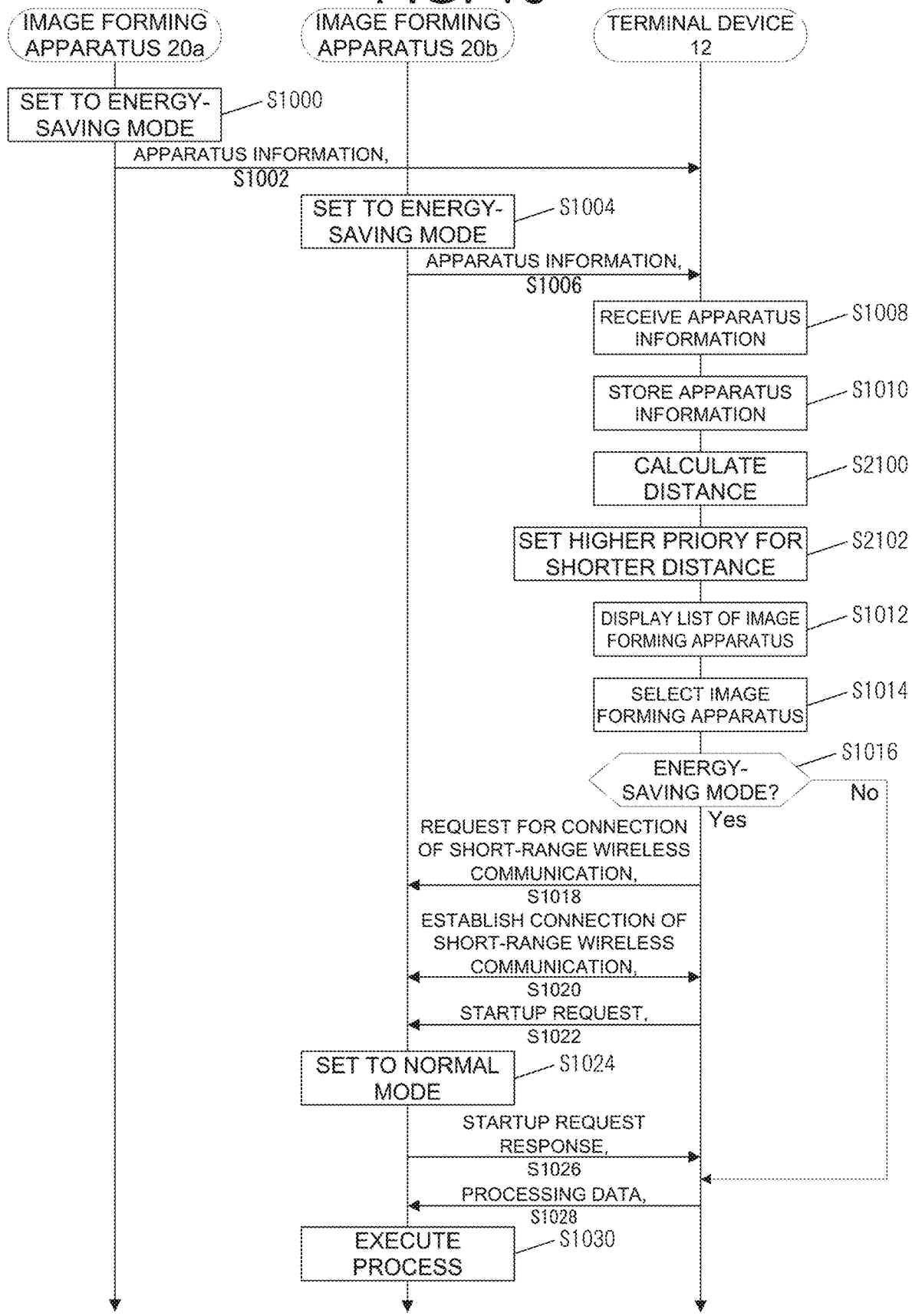
FIG. 16 is a sequence for illustrating an example of the flow of processes in the second embodiment.

2.2.2 Method of Setting Priority According to Distance to Image Forming Apparatus A second method is to set the priority according to the distance to the image forming apparatus. FIG. 16 illustrates the processes executed by the terminal 12 and the image forming apparatus 20 when the second method is used. FIG. 16 replaces FIG. 5, and the same processes as those described in FIG. 5 are given the same symbols as in FIG. 5, and description thereof is to be omitted.

The controller 100 of the terminal device 12 stores the apparatus information (step S1010). Then, the controller 100 (priority setter 102) calculates the distance to each of the detected image forming apparatuses 20 (step S2100). For example, for advertising packet received in step S1008, the priority setter 102 acquires information on the strength of the received radio wave (received radio wave strength). The received radio wave strength is, for example, a value of an RSSI (Received Signal Strength Indicator). From the value of the received radio wave strength, the priority setter 102 calculates the distance to the image forming apparatus 20.

Then, the controller 100 (priority setter 102) sets the priority for the apparatus information so that the shorter the distance calculated in step S2100, the higher the priority (step S2102). This allows the controller 100 to list, in step S1012, the information of the detected image forming apparatus 20 in the order of shorter distance to the terminal device 12.

2.2.3 Method of Setting Priority According to History of Communication with Terminal Device A third method is to set the priority according to the history of communication with the terminal device 12. When the third method is used, the storage 260 of the image forming apparatus 20 is caused to store information showing the history of communication with the terminal device 12 (communication history information). The communication history information stores, for example, as shown in FIG. 17, a terminal device ID as identification information for identifying the terminal device 12 as a communication destination (e.g., "dev1"), a communication content showing sent/received information and the like (e.g., "print job received"), and date and time of communication with the terminal device 12 (e.g., "2021/06/20 12:11:32").

The identification information of the terminal device 12 may be, for example, the apparatus name or address information such as an IP (Internet Protocol) address of the terminal device 12. Also, the information identifying the terminal device 12 may be a serial number, an IMEI (International Mobile Unit Identifier) and the like of the terminal device 12.

Figure 18:
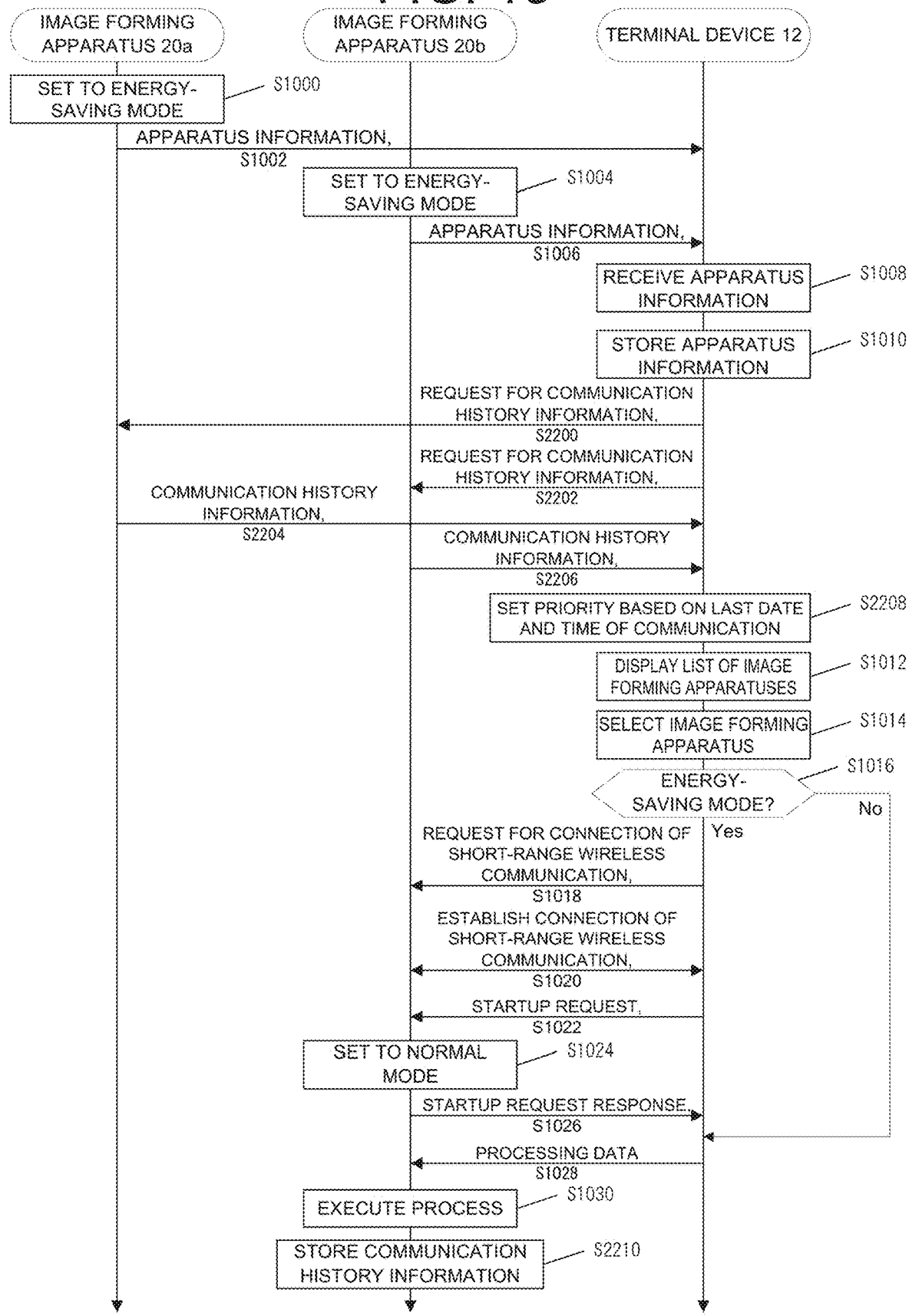
FIG. 18 is a sequence for illustrating an example of the flow of processes in the second embodiment.

FIG. 18 illustrates processes executed by the terminal device 12 and the image forming apparatus 20 when the third method is used. FIG. 18 replaces FIG. 5, and the same processes as those described in FIG. 5 are given the same symbols as in FIG. 5, and description thereof is to be omitted.

The controller 100 of the terminal device 12 stores the apparatus information (step S1010). Then, via the short-range wireless communicator 180 to each of the detected image forming apparatuses 20, the controller 100 (priority setter 102) sends a request for sending the communication history information (communication history information request) (step S2200, S2202). The communication history information request is sent, for example, as a scan request in the BLE.

The controller 200 of the image forming apparatus 20 that received the communication history information request sends, to the terminal device 12, the communication history information stored in the storage 260 (step S2204, step S2206). The communication history information is sent, for example, in a manner to be included in a scan response in the BLE.

Then, from the communication history information storing the terminal device 12 itself as the communication destination, the controller 100 (priority setter 102) of the terminal device 12 acquires, for each of the image forming apparatuses 20, the most recent date and time of communication, thereby to acquire, for each of the image forming apparatuses 20, the date and time of the last communication with the terminal device 12 (last date and time of communication).

Also, the controller 100 (priority setter 102) sets the priority for the communication history information, so that the image forming apparatus 20 whose last date and time of communication is closer to the most recent has a higher priority (step S2208). This allows the controller 100 to list, in step S1012, the information of the detected image forming apparatuses 20 in the order of the last date and time of communication closer to the most recent.

After executing the process that is based on the processing data sent from the terminal device 12, the controller 200 of the image forming apparatus 20 stores the communication history information that is based on the processing data received from the terminal device 12 (step S2210). For example, the controller 200 generates the communication history information including the identification information of the terminal device 12 that sent the processing data in step S1030, the content of the received processing data (communication content), and the date and time of communication with the terminal device 12, and stores the communication history information in the storage 160.

The time at which the controller 100 acquires the communication history information may be just before setting the priority, as shown in FIG. 18, for example, or may be at a periodical or predetermined time. In this case, it is sufficient that the controller 100 stores the acquired communication history information in the storage 160, and reads out the communication history information before executing the process in step S2208 in FIG. 18.

According to the third method, the user can quickly select the image forming apparatus that is in constant use to make the return from energy-saving, and can access the image forming apparatus having been caused to make the return from energy-saving, and thereby the user can use the above image forming apparatus without having to change setting, thus making the operation more efficient.

2.2.4 Method of Setting Priority According to Used Function

A fourth method is to set the priority according to the function used by the user. When the fourth method is used, the storage 160 of the terminal device 12 is caused to store the information (usage history information) showing the history of the image forming apparatus 20's function used via the terminal device 12 (usage history information). As shown in FIG. 19, for example, the usage history information includes the address of the image forming apparatus 20 as the communication target (e.g., "D0:12:34:56:78:9A"), the used function showing the used function (e.g., "copy"), and the date and time of use (e.g., "2021/06/22 14:13:36").

Figure 20:
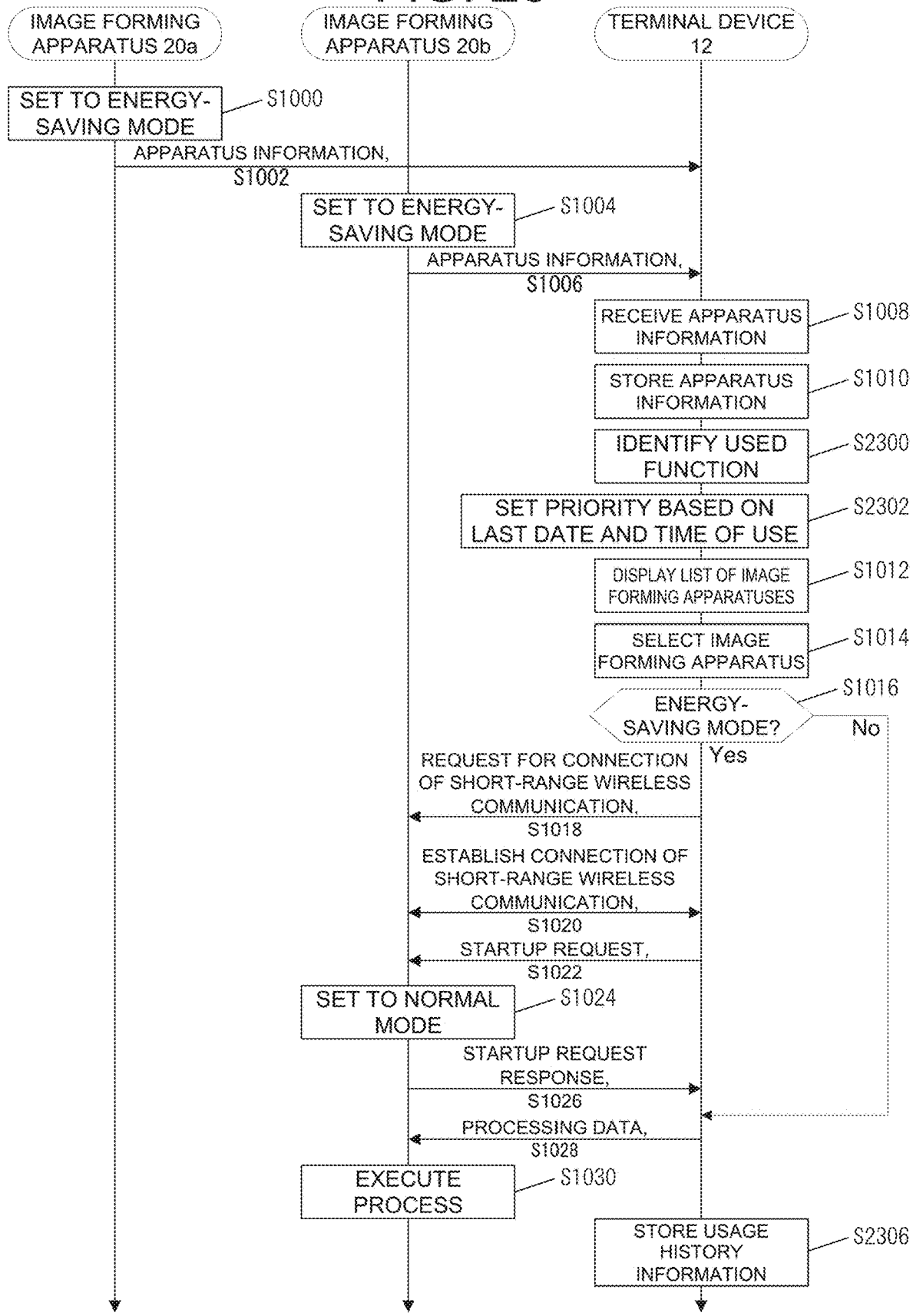
FIG. 20 is a sequence for illustrating an example of the flow of processes in the second embodiment.

FIG. 20 illustrates processes executed by the terminal device 12 and the image forming apparatus 20 when the fourth method is used. FIG. 20 replaces FIG. 5, and the same processes as those described in FIG. 5 are given the same symbols as in FIG. 5, and description thereof is to be omitted.

The controller 100 of the terminal device 12 stores the apparatus information (step S1010). Then, the controller 100 (priority setter 102) identifies the image forming apparatus 20's function used by the user (step S2300). The image forming apparatus 20's functions include, for example, copying, printing, and scanning. For example, the priority setter 102 causes the user to select the to-be-used function, thereby to identify the image forming apparatus 20's function used by the user.

It is permitted that the priority setter 102 causes the user to select whether or not to use any other function related to the image forming apparatus 20's function, and based on the selected result, identifies the other function as a function to be used by the user.

For example, it is assumed that the storage 160 of the terminal device 12 stores an address book information (mobile address book) showing other user's name and contact. Also, it is assumed that the image forming apparatus 20 includes a scanning function that uses the mobile address book and a copying function that does not use the mobile address book. Here, when the user selects to use the mobile address book, the controller 100 identifies, as "scan", the image forming apparatus 20's function used by the user. Meanwhile, when the user selects not to use the mobile address book, the controller 100 identifies, as "copy", the image forming apparatus 20's function used by the user.

Then, of the usage history information stored in the storage 160, the controller 100 (priority setter 102) reads out the usage history information in which the image forming apparatus 20's function identified in step S2300 is stored as the used function, and acquires the latest date and time of use for each of the image forming apparatuses 20. With this, the controller 100 acquires, for each of the image forming apparatuses 20, the date and time when the function selected to be used by the user was last used (last use date).

The controller 100 (priority setter 102) sets the priority for the usage history information, so that the image forming apparatus 20 whose last date and time of use is newer (closer to the most recent) has a higher priority (step S2302). This allows the controller 100 to list, in step S1012, the information of the detected image forming apparatuses 20 in the order of the last date and time of use closer to the most recent.

After sending the processing data to the image forming apparatus 20, the controller 100 stores, in the storage 160, the usage history information including the address of the image forming apparatus 20 at a destination of sending the processing data, the image forming apparatus 20's function identified in step S2300, and the date and time when the processing data was sent (step S2306).

According to the fourth method, the user can quickly select the appropriate image forming apparatus 20 according to the to-be-used function, to make the return from energy-saving, and can access the image forming apparatus 20 having been caused to make the return from energy-saving.

2.2.5 Method of Setting Higher Priority for Shorter Return Time

Figure 21:
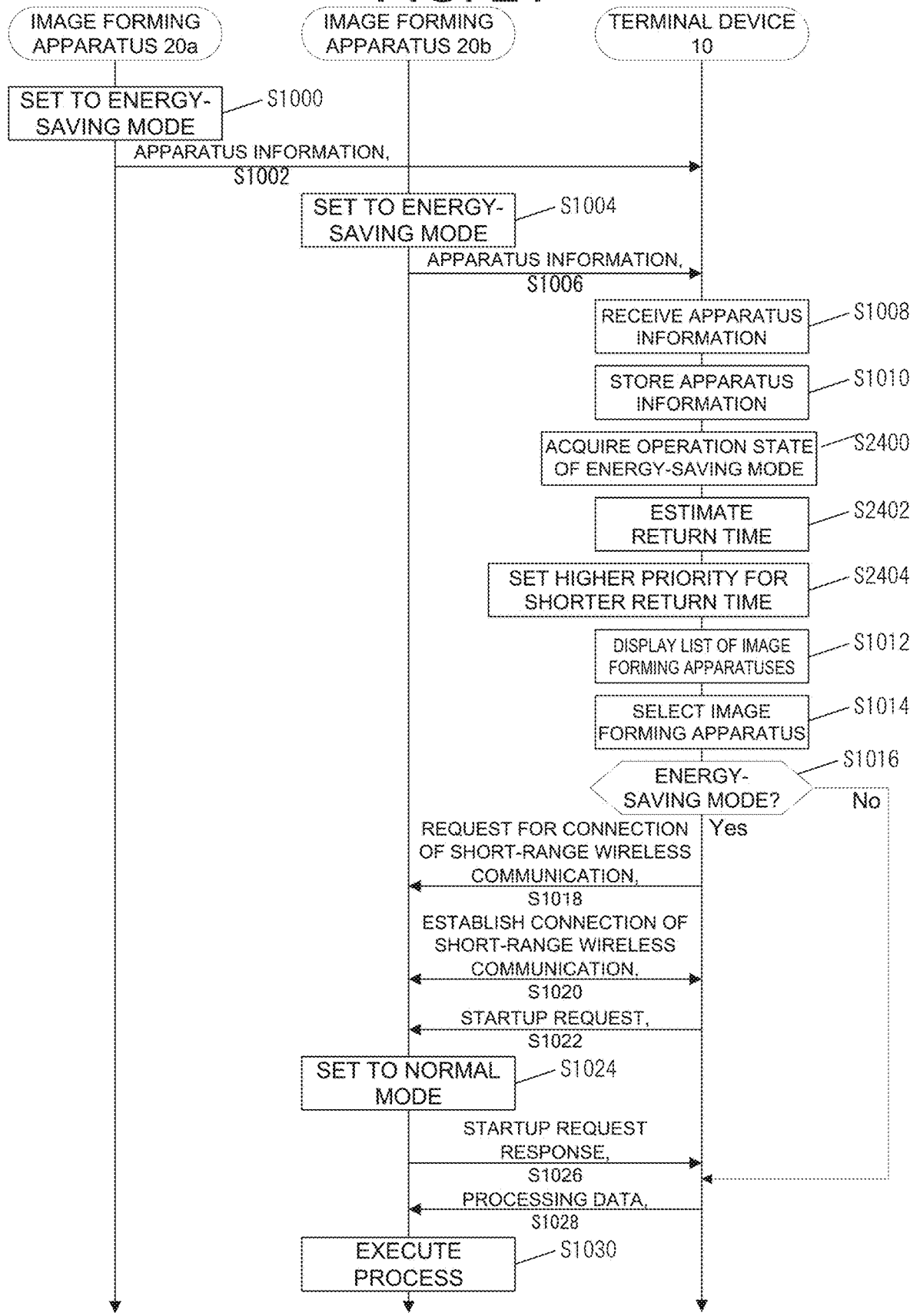
FIG. 21 is a sequence for illustrating an example of the flow of processes in the second embodiment.

A fifth method is to set a higher priority for a shorter return time. FIG. 21 illustrates processes executed by the terminal device 12 and the image forming apparatus 20 when the fifth method is used. FIG. 21 replaces FIG. 5, and the same processes as those described in FIG. 5 are given the same symbols as in FIG. 5, and description thereof is to be omitted.

The controller 100 of the terminal device 12 stores the apparatus information (step S1010). Then, the controller 100 (priority setter 102) acquires an operation state of the energy-saving mode for each of the image forming apparatuses 20 (step S2400). The operation state of the energy-saving mode is, for example, the time elapsed since the transition to the energy-saving mode. The operation state of the energy-saving mode may be the current step (level) of the energy-saving mode when the energy-saving mode has a plurality of steps (levels). The level of the energy-saving mode is defined, for example, by the number and type of functional parts that stop the power supply. In this case, the level of the energy-saving mode is low when there are few functional parts that stop the power supply, and the level of the energy-saving mode is high when there are many functional parts that stop the power supply.

The operation state of the energy-saving mode, for example, may be included in the apparatus information, or may be sent from the image forming apparatus 20 to the terminal device 12 separately from the apparatus information.

Then, the controller 100 (priority setter 102) estimates the return time based on the operation state acquired in step S2400 (step S2402). Concerning the return time, it is sufficient if the length of the return time can be compared among a plurality of image forming apparatuses 20, and it is not necessary to estimate an accurate return time. The priority setter 102 may consider that the longer the elapsed time since the transition to the energy-saving mode, the longer the return time, or that the higher the level of the energy-saving mode, the longer the return time. When the operation mode of the image forming apparatus 20 is the normal mode, the priority setter 102 may consider that the image forming apparatus 20 has no (shortest) return time.

Then, the controller 100 (priority setter 102) sets the priority for notification information (information on the operation state of the energy-saving mode), so that the image forming apparatus 20 with the shorter return time has the higher priority (step S2404). That is, the priority setter 102 sets a higher priority for the image forming apparatus 20 that requires less time to switch from the energy-saving mode to the normal mode. This allows the controller 100 to list, in step S1012, the information of the detected image forming apparatuses 20 in the order of the shorter return time.

According to the fifth method, the user can quickly select the image forming apparatus 20 that require less time for the return from energy-saving, to make the return from energy-saving, and can access the image forming apparatus 20 having been caused to make the return from energy-saving. For example, the longer the time elapsed after switching to the energy-saving mode, the longer it takes for the image forming apparatus 20 to heat a fuser that fuses the toner image to the paper by heat and pressure, and the longer it takes to switch to the normal mode. In contrast, the fifth method makes it easy to select the image forming apparatus 20 that has a short time to become ready for use.

The controller 100 may set the priority for the image forming apparatus 20 by a method other than those described above, or may set the priority using a plurality of methods.

Thus, the terminal device of the present embodiment sets the priority for a plurality of image forming apparatuses, and displays the image forming apparatuses in the order of priority. This allows the user to cause the terminal device to preferentially display the normally-used image forming apparatus or the image forming apparatus that accords to the to-be-used function, making it possible to easily select the to-be-used image forming apparatus.

After setting the priority for the image forming apparatus, the terminal device of the present embodiment may preferentially display the image forming apparatus in the normal mode as the operation mode. Specifically, it is permitted that the terminal device displays, on the list and in the order of priority, the image forming apparatus in the normal mode as the operation mode, and then displays, on the list and in the order of priority, the image forming apparatus 20 in the energy-saving mode as the operation mode. That is, the terminal device lists the image forming apparatuses by the operation mode and according to the priority. With this, the user can easily select the desired image forming apparatus from the image forming apparatuses in the normal mode as the operation mode. Even if there is no desired image forming apparatus among the image forming apparatuses in the normal mode as the operation mode, the user can easily select, from among the image forming apparatuses in the energy-saving mode as the operation mode, the normally-used image forming apparatus or the image forming apparatus that accords to the to-be-used function.

3. Third Embodiment

A third embodiment will be described below. Unlike the first embodiment, the third embodiment is an embodiment in which the to-be-accessed image forming apparatus 20 is automatically selected according to the priority. The present embodiment has replaced FIG. 5 with FIG. 22. The same process is given the same symbol, and description thereof is to be omitted. Also, in the system 1 shown in FIG. 1 of the first embodiment, the present embodiment includes the terminal device 12 described in the second embodiment instead of the terminal device 10.

Figure 22:
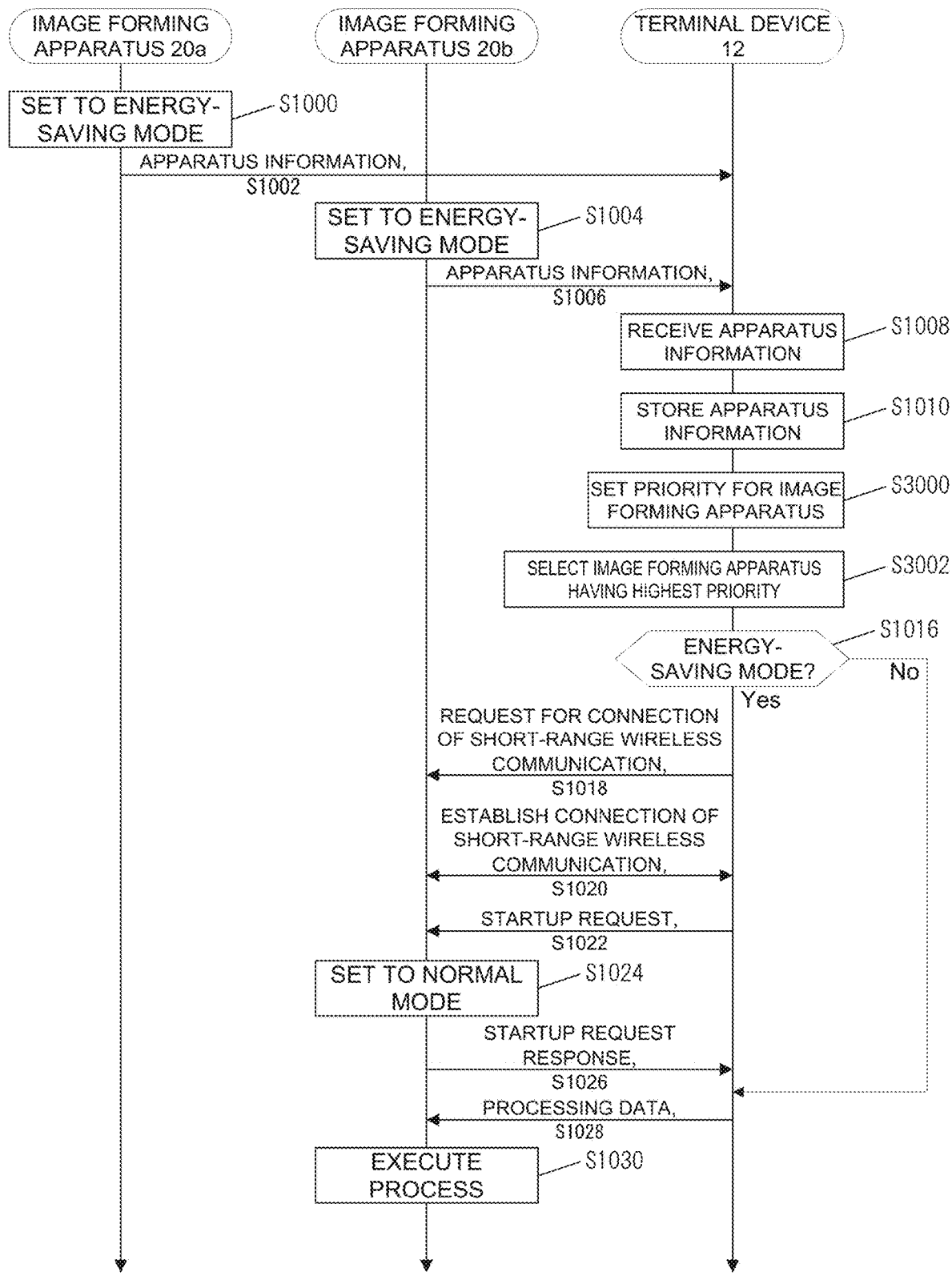
FIG. 22 is a sequence for illustrating the flow of processes in a third embodiment.

FIG. 22 illustrates the flow of processes in the present embodiment. In the present embodiment, the controller 100 of the terminal device 12 stores the apparatus information (step S1010). Then, the controller 100 (priority setter 102) sets the priority for each of the image forming apparatuses 20 (step S3000). The priority setting method may be any of the methods described in the second embodiment, that is, the method selected by the user or the method predetermined as a method to be used for the image forming apparatus 20.

Then, the controller 100 selects the image forming apparatus 20 with the highest priority (step S3002). This allows the controller 100 to automatically select the image forming apparatus 20 as the destination of sending the processing data, without causing the user to select.

Figure 23:
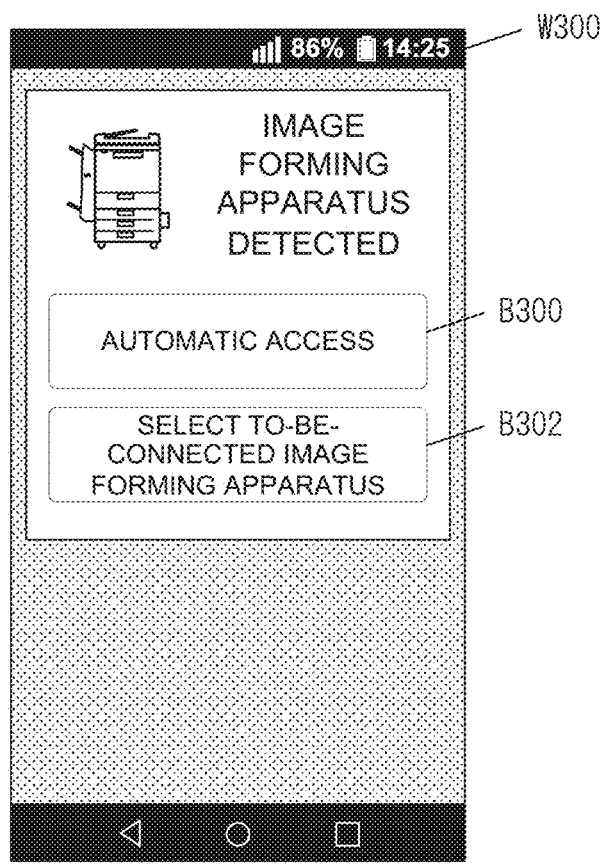
FIG. 23 illustrates an operation example in the third embodiment.

Concerning the selecting of the image forming apparatus 20 as the destination of sending the processing data, the terminal device 12 in the present embodiment may be able to switch between selecting based on the user's operation and selecting automatically. For example, after executing the process in step S3000 in FIG. 22, for example, the controller 100 may display, on the display 140, a display screen W300 as shown in FIG. 23.

The controller 100 may display, as the display screen W300, a screen that includes a button for displaying a screen listing the information of the image forming apparatus 20 described in the second embodiment (manual selection button B302), and a button for selecting the image forming apparatus 20 with the highest priority (automatic selection button B300). When the automatic selection button B300 is selected by the user, the controller 100 executes the process of step S3002 of FIG. 22. That is, when the automatic selection button B300 is selected, the controller 100 automatically selects the image forming apparatus 20 with the priority that is set by a predetermined method and that is the highest, causes the image forming apparatus 20 to make the return from energy-saving, and then accesses the image forming apparatus 20. Meanwhile, when the manual selection button B302 is selected, the controller 100, as in the second embodiment, displays a screen listing the apparatus information of the image forming apparatus 20 based on the priority set by the priority setter 102.

In this way, apart from the screen displaying the state of the operation mode of the plurality of image forming apparatuses 20, the controller 100 displays the automatic selection button B300 for selecting the image forming apparatus 20 with the highest priority. When the automatic selection button B300 is selected, the controller 100 then sends a startup request signal to the image forming apparatus 20 with the highest priority. With this, from among the plurality of image forming apparatuses 20, the user can cause the terminal device 12 to automatically select the image forming apparatus 20 to be accessed after being caused to make the return from energy-saving, or can manually select the to-be-accessed image forming apparatus 20. The automatic selection button B300 may be included in the screen displaying the states of the operation modes of the plurality of image forming apparatuses 20.

By executing the processes described above, the terminal device 12 can automatically access the appropriate image forming apparatus 20 according to the priority setting method. For example, with the image forming apparatus 20's priority set on the terminal device 12 side by setting the image forming apparatus 20's priority using the first method in the second embodiment, the terminal device 12 can access the image forming apparatus with the highest priority, among the image forming apparatuses 20 whose main power is ON.

By setting the priority using the second method in the second embodiment, the terminal device 12 can access the image forming apparatus 20 that is closer to the terminal device 12.

By setting the priority using the third method in the second embodiment, the terminal device 12 can access the image forming apparatus 20 that has a history of past communication with the terminal device 12.

By setting the priority using the fourth method in the second embodiment, the terminal device 12 can access the image forming apparatus 20 most recently operated (printed, scanned or the like). Here, the terminal device 12 can switch the to-be-accessed image forming apparatus 20 according to the function to be used by the user in the future, and can be caused to make the return from energy-saving if necessary. For example, when using the mobile address book, the terminal device 12 causes the image forming apparatus, which used the scanning in the past, to make the return from energy-saving; whereas when not using the mobile address book, the terminal device 12 causes the image forming apparatus, which used the copying in the past, to make the return from energy-saving. As a result, the user can automatically access the ordinarily used image forming apparatus, and can use the ordinarily used image forming apparatus without changing the setting of the ordinarily used image forming apparatus, thus making the operation more efficient.

By setting the priority using the fifth method in the second embodiment, the terminal device 12 can access the image forming apparatus 20 with less waiting time attributable to the return from energy-saving.

When the manual selection button B302 is selected, a screen including a list arranging the information of the image forming apparatus 20 is displayed, and the user selects the to-be-accessed image forming apparatus 20.

In this way, the terminal device of the present embodiment can automatically set the to-be-accessed image forming apparatus from among the detected image forming apparatuses. Also, when the operation mode of the to-be-accessed image forming apparatus 20 is in the energy-saving mode as the operation mode, the terminal device of the present embodiment can cause the to-be-accessed image forming apparatus 20 to make the return from energy-saving.

4. Fourth Embodiment

A fourth embodiment will be described below. In the fourth embodiment, when the user starts operating the image forming apparatus different from the image forming apparatus that has been caused to make the return from energy-saving via the terminal device, the system (1) recognizes that the user has wrongly selected the image forming apparatus as a target of return from energy-saving and automatically returns, to the energy-saving mode, the image forming apparatus that has been caused to make the return from energy-saving. The present embodiment has replaced FIG. 1 with FIG. 24, FIG. 4 with FIG. 25, FIG. 5 with FIG. 27, and FIG. 6 with FIG. 29, respectively. The same unit, the same functional part, and the same process are each given the same symbols, and description thereof is to be omitted.

4.1 Overall Structure

Figure 24:
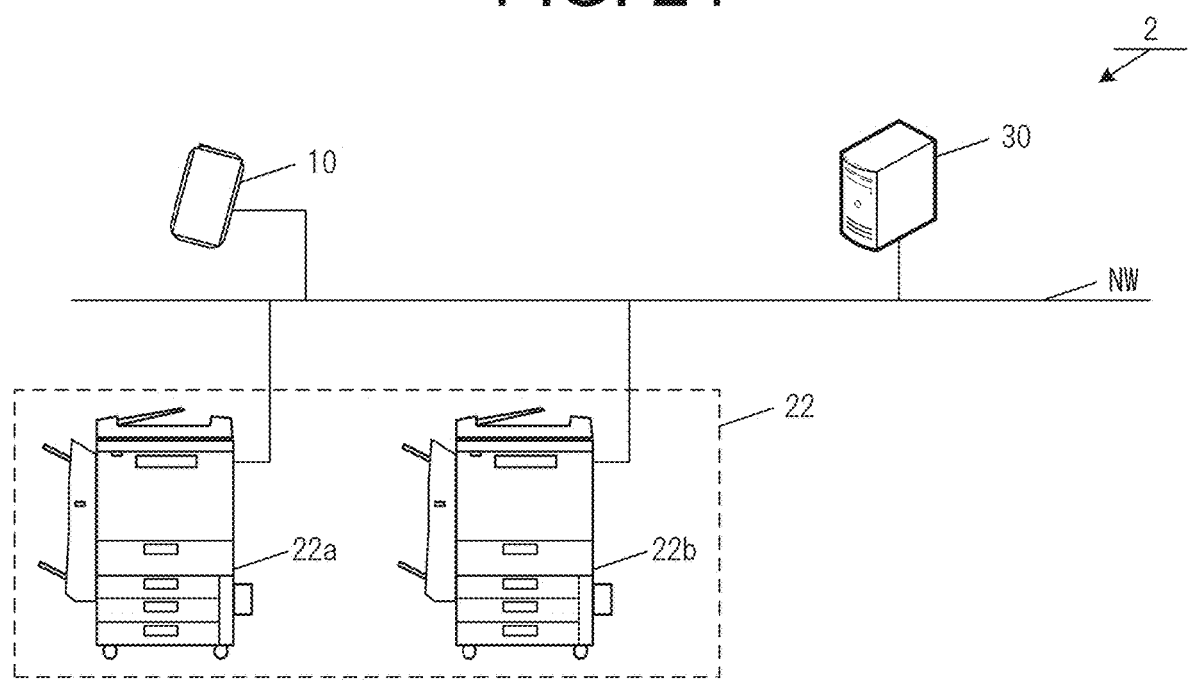
FIG. 24 illustrates the overall configuration of a system in a fourth embodiment.

A system 2 in the present embodiment, as shown in FIG. 24, includes the terminal device 10, an image forming apparatus 22 (an image forming apparatus 22*a*, an image forming apparatus 22*b*), and a management device 30 that are connected to the network NW.

The management device 30 manages the image forming apparatus 22 connected to the network NW. The management device 30 is a computer, such as a PC or server. The management device 30 may be a virtual server realized on any information processor.

4.2 Functional Structure 4.2.1 Image Forming Apparatus

Figure 25:
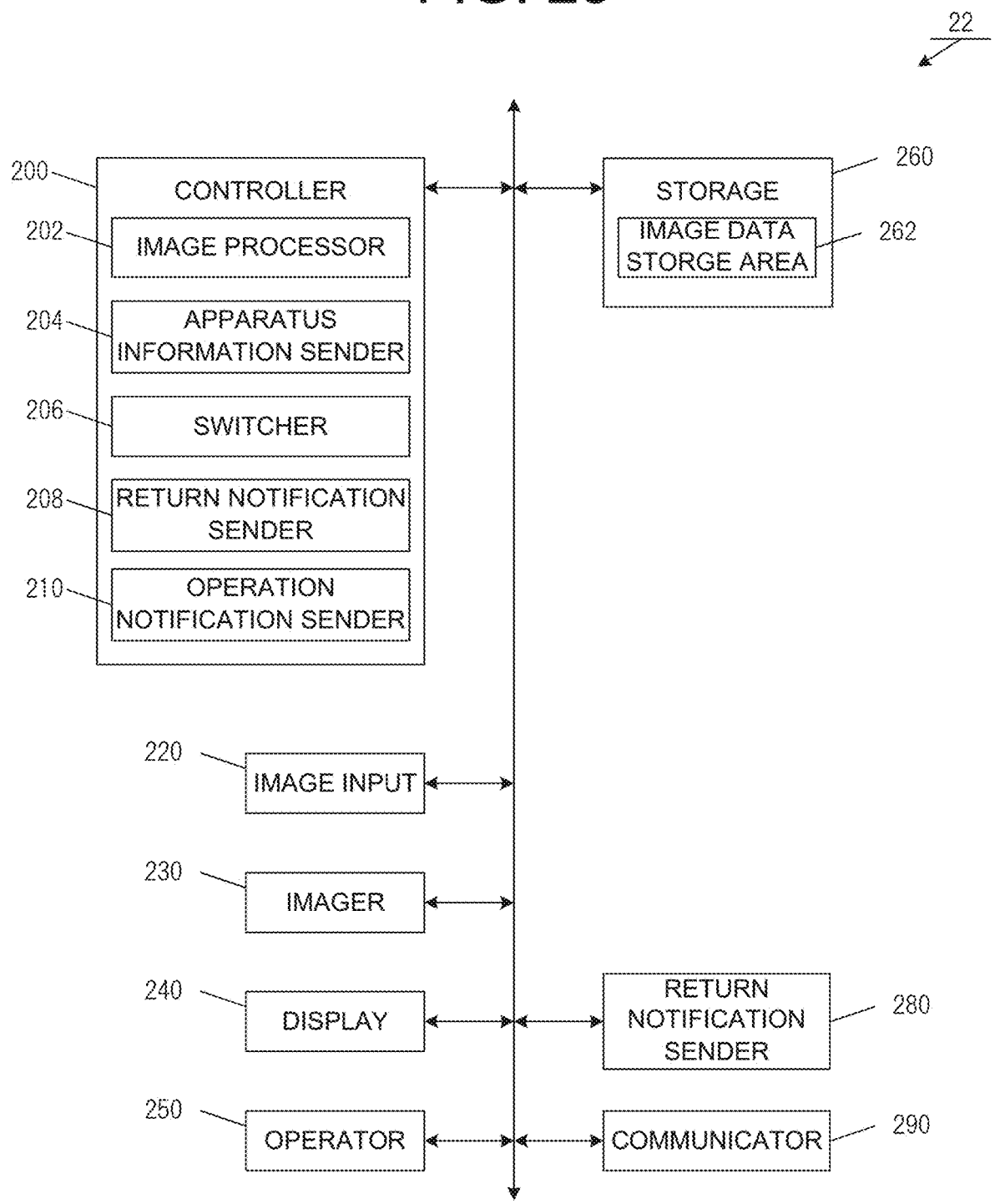
FIG. 25 illustrates the functional structure of an image forming apparatus in the fourth embodiment.

Referring to FIG. 25, the functional structure of the image forming apparatus 22 in the present embodiment will be described. Compared to the image forming apparatus 20, the image forming apparatus 22 has the controller 200 that further functions as a return notification sender 208 and an operation notification sender 210.

When the image forming apparatus 22 makes the return from energy-saving according to the startup request received from the terminal device 10, the return notification sender 208 sends, via the communicator 290 to the management device 30, a notification showing that the image forming apparatus 22 has made the return from energy-saving (return notification). That is, the return notification shows that the operation mode of the image forming apparatus 22 has switched from the energy-saving mode to the normal mode according to the startup request received from the terminal device 10. The return notification is a packet that includes, for example, information showing that the image forming apparatus 22 has made the return from energy-saving and information used to identify the image forming apparatus 22 having made the return from energy-saving.

When an operation is input by the user, the operation notification sender 210 sends, via the communicator 290 to the management device 30, a notification showing that the operation has been executed by the user (operation notification). The operation notification is, for example, a packet that includes information showing that some operation has been executed by the user and information showing the operation content. Monitoring, for example, an operation that is input via the operator 250, and when an operation is input, the operation notification sender 210 sends, via the communicator 290, the operation notification that includes information showing that the operation has been executed, information showing the operation content, and information used to identify the image forming apparatus 22.

Figure 29:
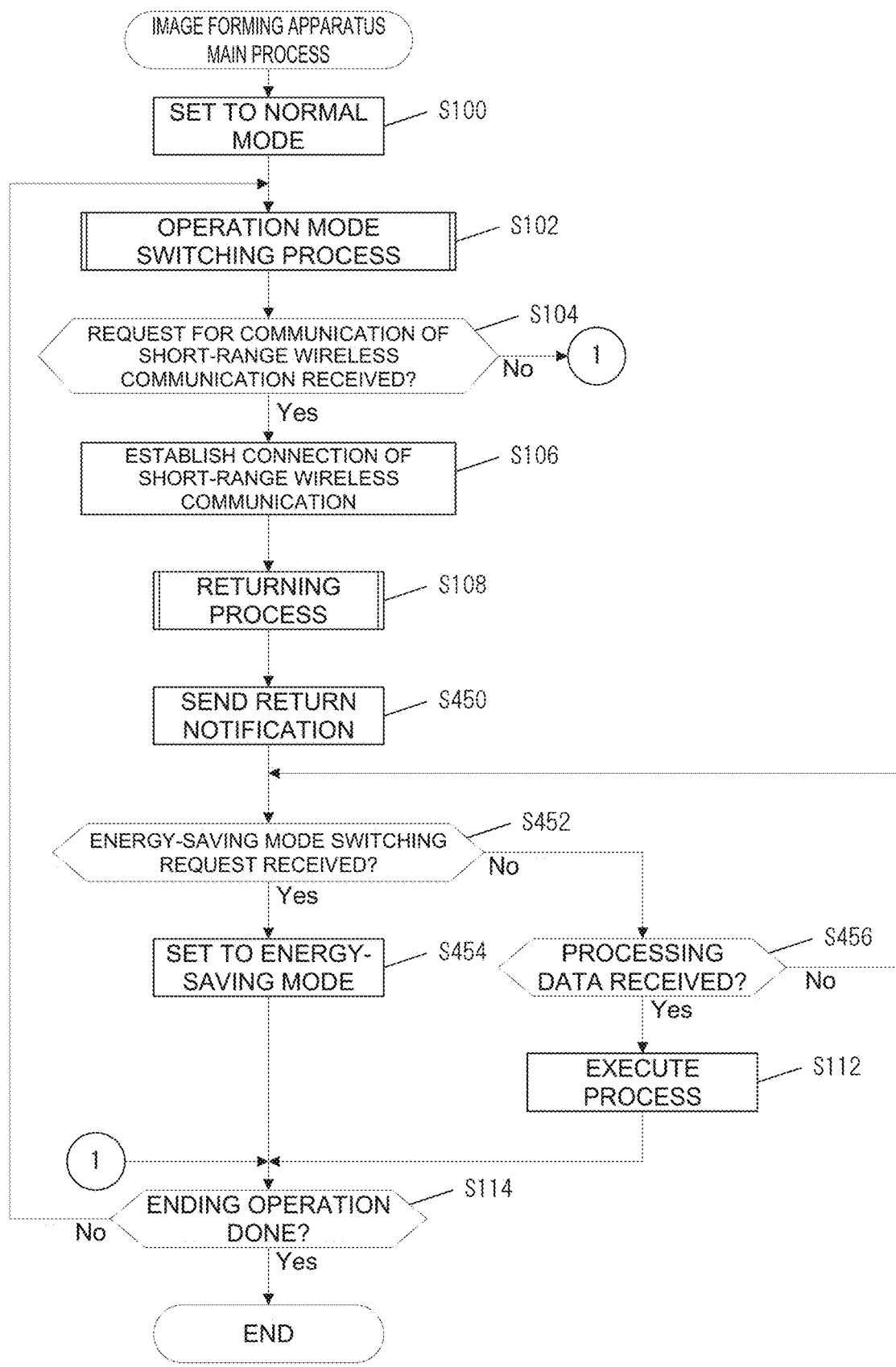
FIG. 29 is a flow for illustrating the flow of processes of the image forming apparatus in the fourth embodiment.

In parallel with the processes shown in FIG. 29 and executed by the image forming apparatus 22, the operation notification sender 210 executes the process of sending the operation notification to the management device 30.

4.2.2 Management Device

Figure 26:
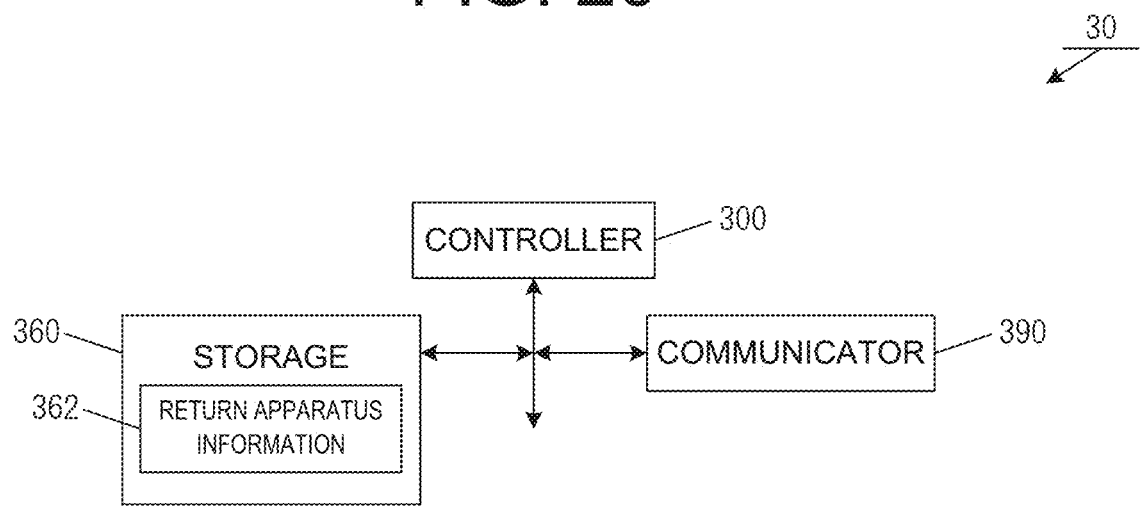
FIG. 26 illustrates the functional structure of a management device in the fourth embodiment.

Referring to FIG. 26, the functional structure of the management device 30 will be described. As shown in FIG. 26, the management device 30 includes a controller 300, a storage 360, and a communicator 390.

The controller 300 controls the entire management device 30. The controller 300 reads out and executes various programs stored in the storage 360 thereby to realize various functions, and is composed of one or more calculators (e.g., CPUs).

The storage 360 stores various programs and various data necessary for operating the management device 30. The storage 360 is composed of a storage, such as SSD or HDD as a semiconductor memory.

The storage 360 stores return apparatus information 362. The return apparatus information 362 stores information capable of identifying the image forming apparatus 22 that has made the return from energy-saving. The return apparatus information 362 is, for example, an IP address, a serial number, and apparatus name of the image forming apparatus 22.

The communicator 390 communicates with an external unit. The communicator 290 is composed of, for example, a communicator such as the NIC used in the wired/wireless LAN, and a communication module.

4.3 Flow of Processes 4.3.1 Overall Flow of Processes

Figure 27:
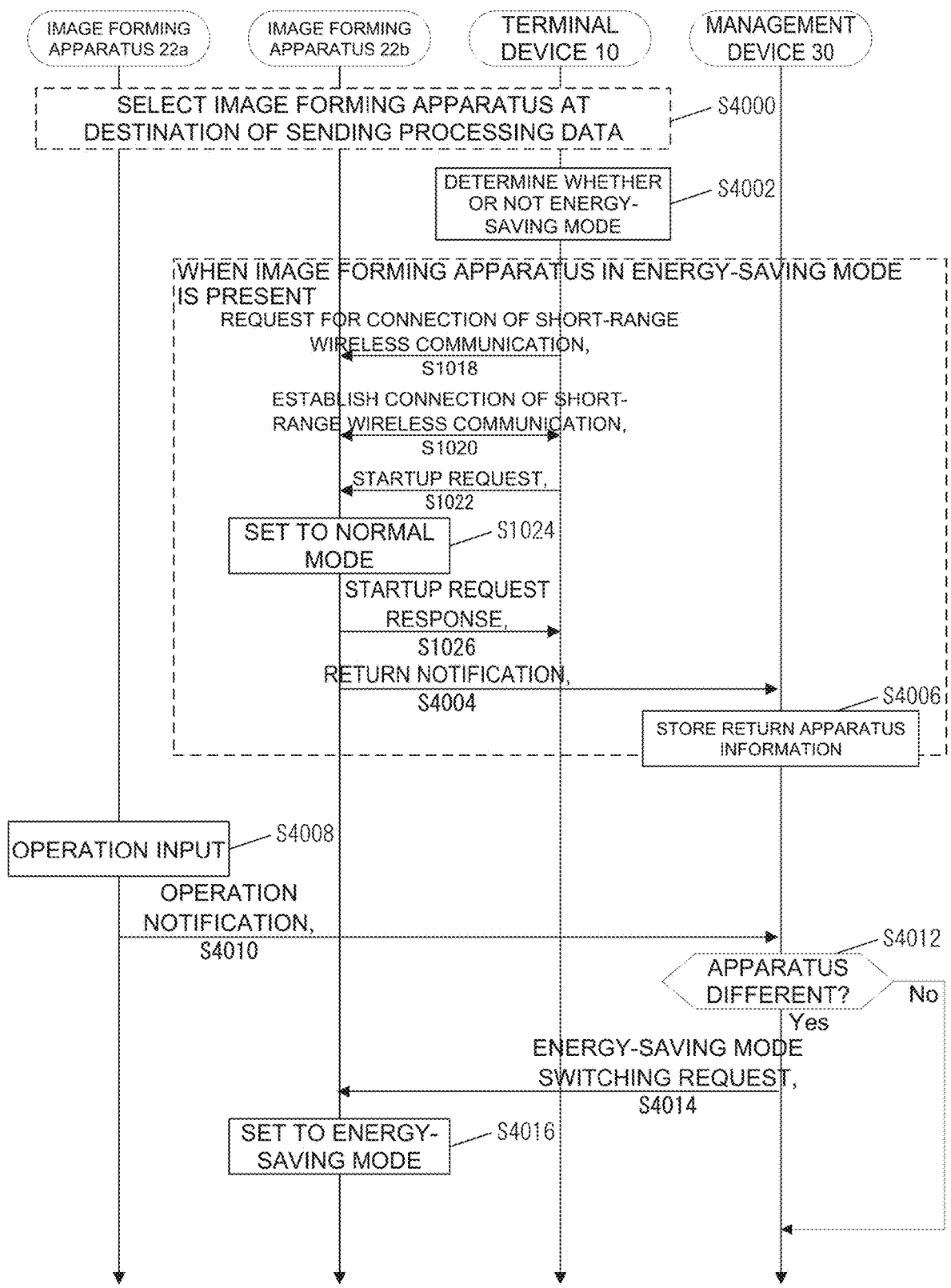
FIG. 27 is a sequence for illustrating the flow of processes in the fourth embodiment.

Referring to FIG. 27, processes executed by the terminal device 10, image forming apparatus 22 (image forming apparatus 22a, image forming apparatus 22b) and management device 30 in the present embodiment will be described. In the following description, it is assumed that two image forming apparatuses 22 (image forming apparatus 22a and image forming apparatus 22b) are present around the terminal device 10.

First, the terminal device 10 executes the process of selecting the image forming apparatus 22 (in the example of FIG. 27, the image forming apparatus 22b) at a destination of sending the processing data (step S4000). The process in step S4000 corresponds to the processes from S1000 to S1014 shown in FIG. 5.

Then, the terminal device 10 determines whether or not the operation mode of the selected image forming apparatus 22 is the energy-saving mode (step S4002). When the image forming apparatus 22 in the energy-saving mode as the operation mode is present, the terminal device 10 sends, to the image forming apparatus 22 in the energy-saving mode as the operation mode, a request for connection of the short-range wireless communication (step S1018). Also, the terminal device 10 establishes, together with the image forming apparatus 22 in the energy-saving mode as the operation mode, the connection of the short-range wireless communication, and sends the startup request (step S1020→S1022).

The image forming apparatus 22 that received the startup request makes the return from energy-saving (step S1024), and sends the startup request response to the terminal device 10 (step S1026). Also, the image forming apparatus 22 sends the return notification to the management device 30 (step S4004). When having received the return notification via the communicator 390, the management device 30 stores the return apparatus information 362 that is based on the return notification (step S4006).

Meanwhile, when having received the operation input by the user, the image forming apparatus 22 (e.g., image forming apparatus 22a) accepts the operation input (step S4008), and sends the operation notification to the management device 30 (step S4010).

The management device 30 receives the operation information via the communicator 390. The management device 30 that received the operation notification determines whether or not the image forming apparatus 22 that sent the operation notification and the image forming apparatus 22 that made the return from energy-saving are different or not (step S4012).

When the image forming apparatus 22 that made the return from energy-saving is different from the image forming apparatus 22 that sent the operation notification, the management device 30 sends a request for setting the operation mode to the energy-saving mode (energy-saving mode switching request), to the image forming apparatus 22 (in the example of FIG. 27, image forming apparatus 22b) that made the return from energy-saving (step S4012; Yes→S4014). The energy-saving mode switching request is a request signal (second request signal) to switch the operation mode of the image forming apparatus 20 to the energy-saving mode. The energy-saving mode switching request is, for example, a packet that includes information showing a request to switch the operation mode to the energy-saving mode.

The image forming apparatus 22 that received the energy-saving mode switching request (in the example of FIG. 27, image forming apparatus 22b) sets the operation mode of the image forming apparatus 22 to the energy-saving mode (step S4016). That is, after receiving the startup request in the returning process (step S108) thereby to set the operation mode to the normal mode, the image forming apparatus 22, when having received the energy-saving mode switching request from the management device 30, sets the operation mode to the energy-saving mode.

4.3.2 Process of Management Device

Figure 28:
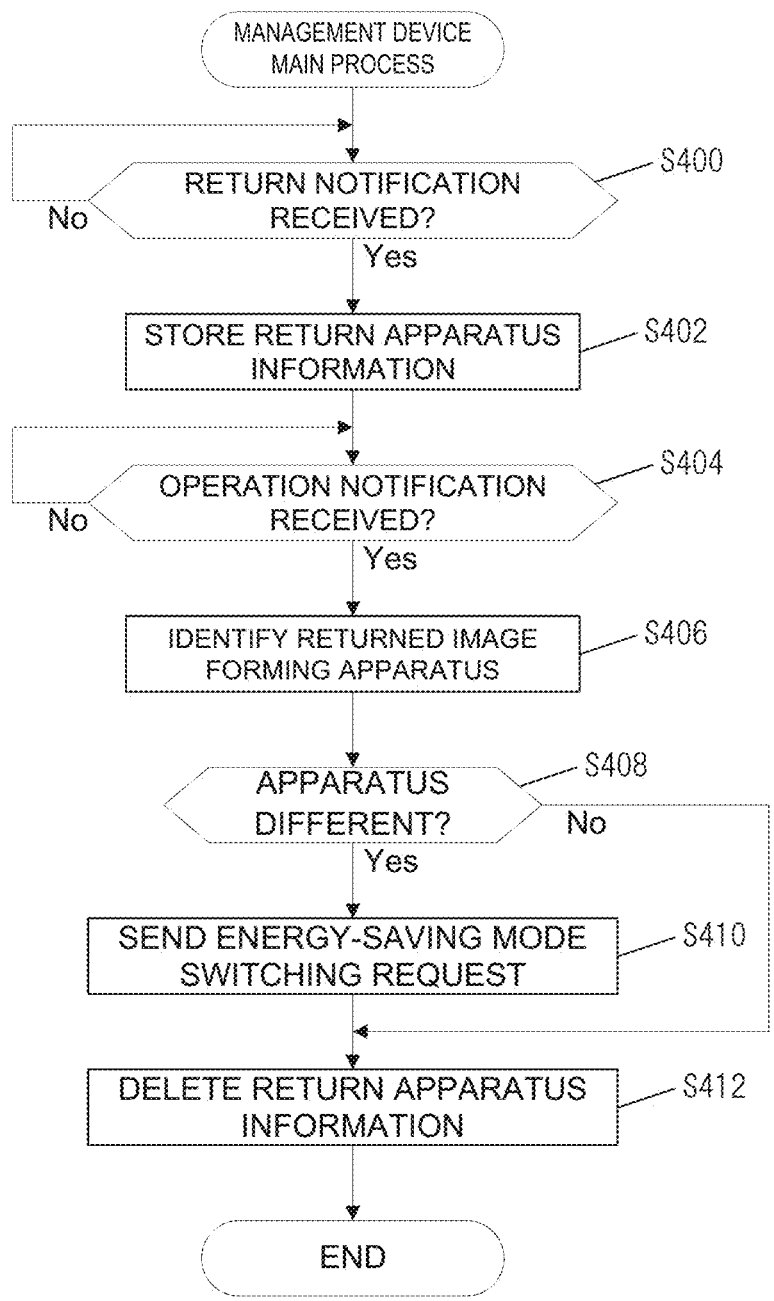
FIG. 28 illustrates a flow for illustrating the flow of processes of the management device in the fourth embodiment.

Referring to FIG. 28, the flow of main processes of the management device 30 will be described. The processes shown in FIG. 28 are executed by the management device 30 reading out the program stored in the storage 360.

First, the controller 300 determines whether or not having received the return notification from the image forming apparatus 22 (step S400). When not having received the return notification from the image forming apparatus 22, the controller 300 repeats step S400 until receiving the return notification from the image forming apparatus 22 (step S400; No). Meanwhile, when having received the return notification from the image forming apparatus 22, the controller 300 stores, in the storage 360, the return apparatus information 362 including the information of the image forming apparatus 22 (e.g., IP address) (step S400; Yes→step S402).

Then, the controller 300 determines whether or not having received the operation notification from the image forming apparatus 22 (step S404). When not having received the operation notification from the image forming apparatus 22, the controller 400 repeats step S404 until receiving the operation notification from the image forming apparatus 22 (step S404; No). Meanwhile, when having received the operation notification from the image forming apparatus 22, the controller 300 reads out the return apparatus information 362 from the storage 360 thereby to identify the image forming apparatus 22 whose operation mode has returned from the energy-saving mode to the normal mode (step S404; Yes→step S406).

Then, the controller 300 determines whether or not the image forming apparatus 22 that sent the operation notification is different from the image forming apparatus 22 identified in step S406 (step S408). For example, the controller 300 determines whether or not the image forming apparatus 22's IP address stored as the return apparatus information 362 is different from the IP address of the image forming apparatus 22 that sent the operation notification in step S4010. In this case, the controller 300, with the two IP addresses being different, determines that the image forming apparatus 22 that returned from the energy-saving mode to the normal mode is different from the image forming apparatus 22 that received the operation input.

When the image forming apparatus 22 that sent the operation notification is different from the image forming apparatus 22 identified in step S406, the controller 300 sends the energy-saving mode switching request to the identified image forming apparatus 22 (step S408; Yes→step S410). When the image forming apparatus 22 that sent the operation notification matches the image forming apparatus 22 identified in step S406, the controller 300 omits the process in step S410 (step S408; No).

Then, the controller 300 deletes the return apparatus information 362 from the storage 360 (step S412). With the above processes executed thereby to operate the image forming apparatus 22 other than the image forming apparatus 22 having made the return from energy-saving, the controller 300 can set, to the energy-saving mode, the image forming apparatus 22 having made the return from energy-saving.

4.3.3 Processes of Image Forming Apparatus

Referring to FIG. 29, the flow of main processes of the image forming apparatus 22 will be described. The processes shown in FIG. 29 are executed by the image forming apparatus 22 reading out the program stored in the storage 260.

In the present embodiment, the controller 200 executes the returning process (step S108). Then, the controller 200 (return notification sender 208) sends the return notification to the management device 30 (step S450).

Then, the controller 200 determines whether or not having received the energy-saving mode switching request from the management device 30 (step S452). When having received the energy-saving mode switching request, the controller 200 (switcher 206) sets the operation mode of the image forming apparatus 22 to the energy-saving mode (step S452; Yes→step S454).

Meanwhile, when not having received the energy-saving mode switching request, the controller 200 determines whether or not having received the processing data from the terminal device 10 (step S452; No→step S456). When having received the processing data from the terminal device 10, the controller 200 executes the process that accords to the above received processing data (step S456; Yes→step S112). Meanwhile, when not having received the processing data, the controller 200 returns to step S450 (step S456; No→step S452).

With the above processes, the image forming apparatus 22, when receiving the energy-saving mode switching request after executing the returning process, can switch the operation mode to the energy-saving mode. Here, the energy-saving mode switching request is sent from the management device 30 when the image forming apparatus 22 different from the image forming apparatus 22 that made the return from energy-saving is operated. With this, even if the image forming apparatus 22 different from the image forming apparatus 22 having made the return from energy-saving is started by the user for operation, the image forming apparatus 22 having made the return from energy-saving can return to the energy-saving mode.

Thus, according to the present embodiment, even if an image forming apparatus different from the image forming apparatus having returned from the energy-saving mode to the normal mode is operated, the image forming apparatus having returned to the normal mode can automatically return to the energy-saving mode, thereby decreasing wasteful consumption of power.

5. Modifications

The present disclosure is not limited to the above embodiments, and various changes are possible. That is, any embodiment acquired by combining any technical measure modified as appropriate within the scope not departing from the gist of the present disclosure is also included in the technical scope of the present disclosure.

Although the above embodiments have some parts described separately for convenience of description, it is of course possible to combine the above parts to the extent technically feasible. For example, the third and fourth embodiments may be put into practice in combination. In this case, when the terminal device 10 automatically returns the to-be-accessed image forming apparatus to the energy-saving mode, thereby to operate the image forming apparatus other than the image forming apparatus having made the return from energy-saving, the image forming apparatus having made the return from energy-saving is set to the energy-saving mode. That is, the system combining the third and fourth embodiments is a system that, when recognizing (determining) that a wrong image forming apparatus has been caused to make the return from energy-saving, immediately returns, to the energy-saving mode, the operation mode of the image forming apparatus that was wrongly caused to make the return from energy-saving.

In the above embodiments, the description has been made of the case of switching the operation mode of the image forming apparatus from the energy-saving mode to the normal mode, but the image forming apparatus may be configured to switch from the normal mode to the energy-saving mode.

The above embodiments have described that the unit which is detected by the terminal device and to which the request (startup request) for return from energy-saving is sent from the terminal device is the image forming apparatus, but the unit may be any other unit. For example, the above embodiments may be applied to a unit such as a display (e.g., a large display used in a conference room and the like), a manufacturing unit that manufactures a predetermined product, or a communicator that sends information by executing facsimile communication and the like.

A program that operate in each unit in the embodiment controls CPUs and the like (program that makes a computer function) in a manner to realize the functions of the above embodiments. The information handled by these units is temporarily stored in a temporary storage (e.g., RAM) at the time of processing the information, and then stored in various ROMs (Read Only Memory), HDDs, or any other storage, and is read out, modified, and written by the CPU as necessary.

Recording media for storing the program may include semiconductor media (e.g., ROMs, non-volatile memory cards and the like), optical and magneto-optical recording media (e.g., DVD (Digital Versatile Disc), MO (Magneto Optical Disc), MD (Mini Disc), CD (Compact Disc), BD (Blu-ray (registered trademark) Disk) and the like), magnetic recording media (e.g., magnetic tapes, flexible disks and the like), and the like. Also, it is not merely that executing the loaded program realizes the functions of the above embodiments, but also that executing processes jointly with the operating system or any other application programs based on an instruction of that program, as the case may be, realizes the functions of the present disclosure.

When distributed in the market, the program can be stored in a portable recording medium for distribution or transferred to a server computer connected via a network such as the Internet. In this case, a storage of the server computer is of course included in the present disclosure.

What is claimed is:

1. A terminal device comprising:
a communicator capable of communicating with a plurality of image forming apparatuses capable of switching an operation mode between an energy-saving mode and a normal mode;
a controller; and
a display,
wherein
the controller,
from the plurality of image forming apparatuses via the communicator, receives information of each image forming apparatus, the information including the operation modes,
based on the information of each image forming apparatus, displays states of the operation modes of each of the plurality of image forming apparatuses on the display,
displays an automatic selection button on the display, wherein the automatic selection button, when selected, the controller selects an image forming apparatus accessed by the terminal device from the plurality of image forming apparatuses, and
sends a request signal, which switches the operation mode, via the communicator, to the image forming apparatus selected by the controller.

2. The terminal device according to claim 1, wherein the controller
sets a priority for each of the plurality of image forming apparatuses, and
according to the priority, displays the states of the operation modes of each of the plurality of image forming apparatuses.

3. The terminal device according to claim 1, wherein the controller
selects, in response to that the automatic selection button is selected, an image forming apparatus with a highest priority from the plurality of image forming apparatuses.

4. The terminal device according to claim 3, wherein the controller sets the priority for each of the plurality of image forming apparatuses according to a time of use of each of the plurality of image forming apparatuses, wherein the image forming apparatus including a function selected by a user has been used at a more recent time has a higher priority.

5. The terminal device according to claim 3, wherein the controller sets the priority for each of the plurality of image forming apparatus, according to a time interval for each of the plurality of image forming apparatuses to switch from the energy-saving mode to the normal mode, wherein the image forming apparatus requires lesser time interval to switch has a higher priority.

6. The terminal device according to claim 1, wherein the controller displays a manual selection button on the display, when the manual selection button is selected, the image forming apparatus accessed by the terminal device is selectable externally.

7. A system comprising:
a plurality of image forming apparatuses; and
a terminal device,
wherein
the plurality of image forming apparatuses each has a switcher that switches an operation mode between an energy-saving mode and a normal mode,
the terminal device includes
a receiver that, from the plurality of image forming apparatuses, receives information of each of the plurality of image forming apparatuses, the information including the operation modes,
a display that, based on the information of each of the plurality of image forming apparatuses, displays states of the operation modes of each of the plurality of image forming apparatuses,
a controller that displays an automatic selection button on the display, wherein when the automatic selection button is selected, the controller selects an image forming apparatus accessed by the terminal device, from among the plurality of image forming apparatuses, and
a sender that sends a request signal to the image forming apparatus selected by the controller, the request signal switching the operation mode of the selected image forming apparatus.

8. A system comprising:
a plurality of image forming apparatuses;
a terminal device; and
a management device connected to the plurality of image forming apparatuses and the terminal device,
wherein
the plurality of image forming apparatuses each has a switcher that switches an operation mode between an energy-saving mode and a normal mode,
the terminal device includes
a receiver that, from the plurality of image forming apparatuses, receives information of each of the plurality of image forming apparatuses, the information including the operation modes,
a display that, based on the information of each of the plurality of image forming apparatuses, displays the state of each of the operation modes of the plurality of image forming apparatuses, and
a sender that sends a request signal to the image forming apparatus selected from among the plurality of image forming apparatuses, the request signal switching the operation mode of the selected image forming apparatus,
the plurality of image forming apparatuses each includes
a return notification sender that, to the management device, sends a return notification showing that at least one of the plurality of image forming apparatuses has returned to the normal mode in response to receiving of the request signal, and an operation notification sender that, to the management device, sends an operation notification showing that an operation has been executed, the management device includes a second sender that, when the image forming apparatus having sent the return notification and the image forming apparatus having sent the operation notification are different, sends, to the image forming apparatus having sent the return notification, a second request signal, the second request signal switching the operation mode to the energy-saving mode, and the switcher, in response to receiving the second request signal, switches the operation mode to the energy-saving mode.

\* \* \* \* \*